US008619713B2

(12) United States Patent
Ma et al.

(10) Patent No.: US 8,619,713 B2
(45) Date of Patent: *Dec. 31, 2013

(54) SOFT HANDOFF FOR OFDM

(75) Inventors: Jianglei Ma, Kanata (CA); Ming Jia, Ottawa (CA); Peiying Zhu, Kanata (CA); Wen Tong, Ottawa (CA); Dong-Sheng Yu, Ottawa (CA)

(73) Assignee: Microsoft Corporation, Redmond, WA (US)

(*) Notice: Subject to any disclaimer, the term of this patent is extended or adjusted under 35 U.S.C. 154(b) by 275 days.

This patent is subject to a terminal disclaimer.

(21) Appl. No.: 12/983,636

(22) Filed: Jan. 3, 2011

(65) Prior Publication Data

US 2011/0096751 A1 Apr. 28, 2011

Related U.S. Application Data

(63) Continuation of application No. 12/343,866, filed on Dec. 24, 2008, now Pat. No. 7,864,735, which is a continuation of application No. 11/403,469, filed on Apr. 13, 2006, now abandoned, which is a continuation of application No. 10/104,399, filed on Mar. 22, 2002, now Pat. No. 7,042,858.

(51) Int. Cl.
*H04W 4/00* (2009.01)
*H04J 11/00* (2006.01)
*H04J 1/00* (2006.01)

(52) U.S. Cl.
USPC .............................. 370/331; 370/208; 370/343

(58) Field of Classification Search
None
See application file for complete search history.

(56) References Cited

U.S. PATENT DOCUMENTS

| 6,952,454 | B1 | 10/2005 | Jalali et al. |
| 7,042,858 | B1* | 5/2006 | Ma et al. ............... 370/331 |
| 7,864,735 | B2* | 1/2011 | Ma et al. ............... 370/331 |
| 2002/0114270 | A1 | 8/2002 | Pierzga et al. |
| 2002/0154705 | A1 | 10/2002 | Walton et al. |
| 2003/0072255 | A1 | 4/2003 | Ma et al. |
| 2004/0057530 | A1 | 3/2004 | Tarokh et al. |
| 2004/0066866 | A1 | 4/2004 | Tong et al. |

(Continued)

FOREIGN PATENT DOCUMENTS

| CN | 1653844 | 8/2005 |
| EP | 0902551 A2 | 3/1999 |

(Continued)

OTHER PUBLICATIONS

"Final Office Action", U.S. Appl. No. 12/343,866, (Feb. 19, 2010), 5 Pages.

(Continued)

Primary Examiner — Jutai Kao
(74) Attorney, Agent, or Firm — Wolfe-SBMC

(57) ABSTRACT

The present invention relates to soft handoffs in an OFDM system. Each mobile terminal measures pilot signal strengths of transmissions from adjacent base stations. If the pilot signal strength for a base station exceeds the defined threshold, that base station is added to an active set list. Each mobile terminal notifies the base stations of their active set lists. By providing the set list to the base station controller and the servicing base station, the mobile terminal identifies the sole servicing base station or triggers a soft handoff mode when multiple base stations appear on the active set list. The soft handoff mode uses a combination of scheduling and space-time coding to affect efficient and reliable handoffs.

18 Claims, 14 Drawing Sheets

(56) References Cited

U.S. PATENT DOCUMENTS

| | | |
|---|---|---|
| 2004/0085892 A1 | 5/2004 | Walton et al. |
| 2006/0274638 A1 | 12/2006 | Walton et al. |
| 2009/0103494 A1 | 4/2009 | Ma et al. |

FOREIGN PATENT DOCUMENTS

| | | |
|---|---|---|
| EP | 1187503 A1 | 3/2002 |
| KR | 20090128576 | 12/2009 |
| KR | 20100111728 | 10/2010 |
| KR | 101300947 | 8/2013 |
| KR | 101300977 | 8/2013 |
| WO | WO-03081938 | 10/2003 |

OTHER PUBLICATIONS

"Foreign Office Action", EP Application No. 03701632.6, (Nov. 22, 2007), 4 pages.

"Non Final Office Action", U.S. Appl. No. 11/403,469, (Jun. 24, 2008), 4 pages.

"Non Final Office Action", U.S. Appl. No. 12/343,866, (Jul. 23, 2009), 4 pages.

"Notice of Allowance", U.S. Appl. No. 10/104,399, (Dec. 14, 2005), 6 Pages.

"Notice of Allowance", U.S. Appl. No. 12/343,866, (May 21, 2010), 7 Pages.

"Notice of Allowance", U.S. Appl. No. 12/343,866, (Sep. 2, 2010), 4 pages.

Vahid Tarokh et al., "New Detection Schemes for Transmit Diversity with no Channel Estimation," ICUPC, pp. 917-920, 1998.

International Search Report for PCT/IB03/00153 mailed Dec. 6, 2003.

"Foreign Notice of Allowance", Korean Application No. 10-2009-7024611, (May 22, 2013), 3 pages.

"Foreign Notice of Allowance", Korean Application No. 10-2010-7018645, (May 22, 2013), 3 pages.

"Foreign Office Action", Korean Application No. 10-2009-7024611, (Dec. 26, 2012), 6 pages.

"Foreign Office Action", Korean Application No. 10-2010-7018645, (Dec. 26, 2012) 6 pages.

"Foreign Office Action", Korean Application No. 10-2013-7010485, (Aug. 7, 2013), 6 Pages.

"Foreign Office Action", Korean Application No. 10-2013-7010506, (Aug. 16, 2013), 7 Pages.

\* cited by examiner

BASE STATIONS

| | BS1 | BS2 | BS3 | BS4 | BS5 | BS6 | BS7 | BS8 | BS9 |
|---|---|---|---|---|---|---|---|---|---|
| A | | | ■ | ■ | | | | | |
| B | | | ■ | | ■ | | | | |
| C | | | ■ | ■ | ■ | | | | |
| D | | | ■ | ■ | ■ | | | | |
| E | | | ■ | ■ | ■ | | | | |
| F | ■ | | | | | ■ | | | |
| G | ■ | | | | | | ■ | | |
| H | ■ | | | | | ■ | ■ | | |
| I | ■ | | | | | ■ | ■ | | |
| J | ■ | | | | | ■ | ■ | | |
| K | | ■ | | | | | | ■ | |
| L | | ■ | | | | | | | ■ |
| M | | ■ | | | | | | ■ | ■ |
| N | | ■ | | | | | | ■ | ■ |
| O | | ■ | | | | | | ■ | ■ |

MOBILE TERMINALS (row axis)

ACTIVE SET LIST

*FIG. 6*

SOFT HANDOFF FOR OFDM

This application is a continuation of U.S. patent application Ser. No. 12/343,866, filed Dec. 24, 2008, which is a continuation of U.S. patent application Ser. No. 11/403,469, filed Apr. 13, 2006, which is a continuation of U.S. patent application Ser. No. 10/104,399, filed Mar. 22, 2002, now issued as U.S. Pat. No. 7,042,858, the disclosures of which are incorporated herein by reference in their entireties.

FIELD OF THE INVENTION

The present invention relates to wireless communications, and in particular to facilitating soft handoffs in orthogonal frequency division multiplexing (OFDM) systems.

BACKGROUND OF THE INVENTION

Wireless communication systems divide areas of coverage into cells, each of which is served by a base station. A mobile terminal will continuously monitor the signal strengths of the servicing base station for the current cell as well as for adjacent cells. The mobile terminal will send the signal strength information to the network. As the mobile terminal moves toward the edge of the current cell, the servicing base station will determine that the mobile terminal's signal strength is diminishing, while an adjacent base station will determine the signal strength is increasing. The two base stations coordinate with each other through the network, and when the signal strength of the adjacent base station surpasses that of the current base station, control of the communications is switched to the adjacent base station from the current base station. The switching of control from one base station to another is referred to as a handoff.

A hard handoff is a handoff that completely and instantaneously transitions from a first to a second base station. Hard handoffs have proven problematic and often result in dropped calls. CDMA systems incorporate a soft handoff, wherein when the mobile terminal moves from a first to a second cell, the handoff process happens in multiple steps. First, the mobile terminal recognizes the viability of the second base station, and the network allows both the current and adjacent base stations to carry the call. As the mobile terminal move closer to the second base station and away from the first base station, the signal strength from the first base station will eventually drop below a useful level. At this point, the mobile terminal will inform the network, which will instruct the first base station to drop the call and let the second base station continue servicing the call. Accordingly, a soft handoff is characterized by commencing communications with a new base station before terminating communications with the old base station. Soft handoffs in CDMA systems have proven very reliable.

In the ever-continuing effort to increase data rates and capacity of wireless networks, communication technologies evolve. Multiple-input-multiple-output (MIMO) orthogonal frequency division multiplexing (OFDM) systems represent an encouraging solution for the next generation high-speed data downlink access. A benefit of such systems is their high spectral efficiency wherein all of the allocated spectrum can be used by all base stations. The systems are generally considered to have a frequency reuse factor of one. Unfortunately, these systems generate strong co-channel interference, especially at cell borders. Basic frequency reuse-one planning will lead to very low data rates and a poor quality of service for mobile terminals at cell borders. Even though data repetition, re-transmission techniques, and fairness scheduling for data transmission can be employed, it is difficult to equalize data rate distribution across the cell. Accordingly, high-speed data service is severely limited.

In other technologies, such as CDMA, soft handoffs are used to enhance service at cell borders. However, a straightforward extension of soft handoff techniques developed for CDMA systems is not applicable to the MIMO-OFDM systems, since the separation of the interference for the OFDM waveform is virtually impossible. Because different spreading code masking is not available in OFDM transmission, the destructive interferences between base stations transmitting the same signal can cause significant degradation of performance. Accordingly, there is a need for an efficient soft handoff technique for OFDM systems as well as a need to increase data rates and reduce interference at cell borders.

SUMMARY OF THE INVENTION

The present invention relates to soft handoffs in an OFDM system. In downlink communications, each mobile terminal constantly measures all of the possible pilot signal strengths of transmissions from adjacent base stations, identifies the strongest pilot signals, and compares them against a defined threshold. If the pilot signal strength for a base station exceeds the defined threshold, that base station is added to an active set list. Each mobile terminal will notify the base stations of their active set lists. If there is only one base station in the active set list, that base station is singled out to service the mobile terminal. If there is more than one base station on the active set list, a soft handoff is enabled between those base stations. The soft handoff condition will continue until only one base station is on the active set list, wherein the lone base station will continue to serve the mobile terminal. The soft handoff can be initiated by the mobile terminal, which will report the active set list to the base station controller via the servicing base station. The base station controller will alert the base stations on the active set list of the soft handoff. Notably, the base station controller can select a sub-set of the base stations from the active set list to establish the soft hand off. During soft handoff, all base stations on the active set list will facilitate communications with the mobile terminal as defined below. Preferably, the base station controller keeps track of all of the active set lists for the respective mobile terminals. The mobile terminals will keep track of their individual set lists.

Accordingly, by providing the set list to the base station controller and the servicing base station, the mobile terminal identifies the sole servicing base station or triggers a soft handoff (SHO) mode when multiple base stations appear on the active set list. The SHO mode uses a combination of scheduling and STC coding to affect efficient and reliable handoffs. During a SHO mode, the base station controller either multicasts or non-multicasts data packets intended for the mobile terminal to each of the base stations on the active set list. Multicasting indicates that each data packet is sent to each base station on the active set list for transmission to the mobile terminal. Non-multicasting indicates that data packets are divided into to sub-packets in some manner and each sub-packet is sent to one of the base stations on the active set list for transmission to the mobile terminal. Unlike multicasting, redundant information is not transmitted from each base station on the active set list.

In either multicasting or non-multicasting embodiments, the base stations in the active set can partition the time and frequency resources of the OFDM signal. Accordingly, each base station transmits part of the OFDM signal sub-band. Preferably, a boost in transmit power is associated with sub-bands being used. The base stations provide STC encoding of the transmitted data and the mobile terminals provide corresponding STC decoding to recover the transmitted data. The STC coding may be either space-time-transmit diversity (STTD) or V-BLAST-type coding. STTD coding encodes data into multiple formats and simultaneously transmits the multiple formats with spatial diversity (i.e. from antennas at different locations). V-BLAST t-type coding separates data into different groups and separately encodes and simultaneously transmits each group. Other coding will be recognized by those skilled in the art. The mobile terminal will separately demodulate and decode the transmitted data from each base station, and then combine the decoded data from each base station to recover the original data.

Prior OFDM handoffs were hard handoffs, and the servicing base station handled scheduling of data for transmission for any given mobile terminal autonomously. Since only one base station served a mobile terminal at any one time, there was no need to employ joint scheduling. In contrast, the present invention employs joint scheduling for base stations on the active set list of a mobile terminal. As such, the base station controller or like scheduling device is used to schedule data packets for transmission during the SHO mode for each mobile terminal. Although the base station controller may provide all scheduling for associated base stations, the preferred embodiment of the present invention delegates scheduling of data for mobile terminals that are not in the SHO mode to the servicing base station. In this arrangement, a scheduler is employed at the base station controller to assign data to a time slot for the base stations on the active set list. The base stations perform joint base station space-time coding. The time slots not assigned by the base station controller scheduler are used for data of mobile terminals not participating in a soft handoff.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

FIG. 6 is a table illustrating an active set list table according to one embodiment of the present invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
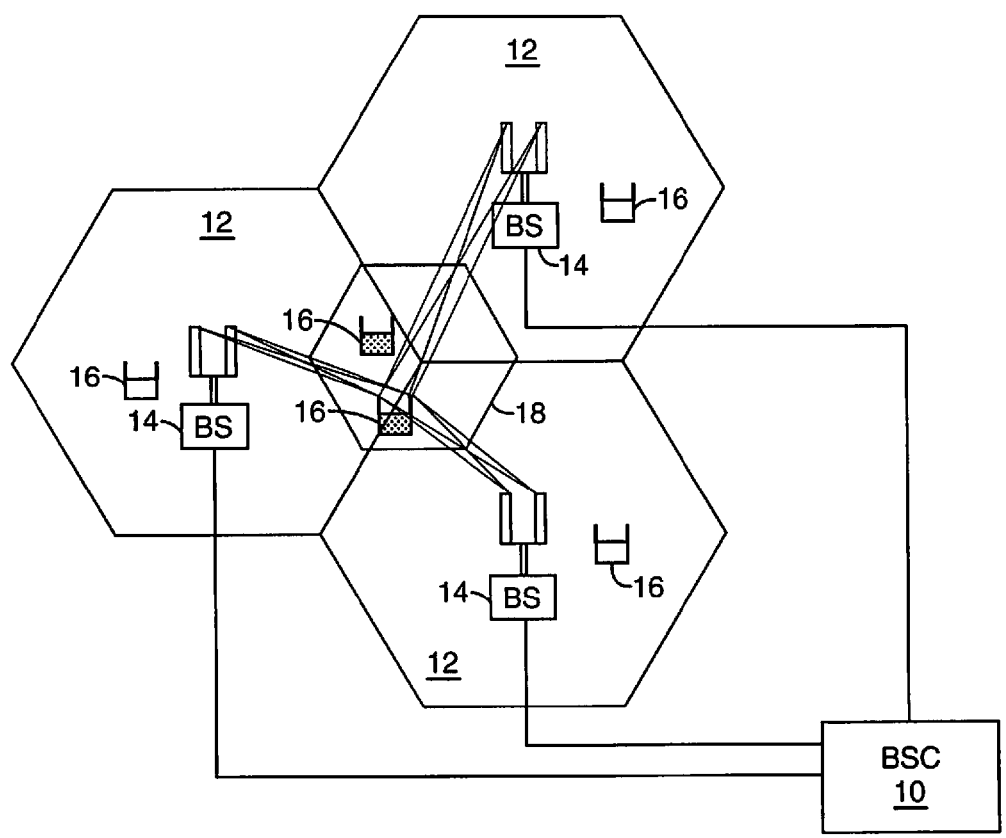
FIG. 1 is a block representation of a cellular communication system.

With reference to FIG. 1, a base station controller (BSC) 10 controls wireless communications within multiple cells 12, which are served by corresponding base stations (BS) 14. In general, each base station 14 will facilitate communications with mobile terminals 16, which are within the cell 12 associated with the corresponding base station 14. As a mobile terminal 16 moves from a first cell 12 to a second cell 12, communications with the mobile terminal 16 transition from one base station 14 to another. The term "handoff" is generally used to refer to techniques for switching from one base station 14 to another during a communication session with a mobile terminal 16. The base stations 14 cooperate with the base station controller 10 to ensure that handoffs are properly orchestrated, and that data intended for the mobile terminal 16 is provided to the appropriate base station 14 currently supporting communications with the mobile terminal 16.

Handoffs are generally characterized as either hard or soft. Hard handoffs refer to handoffs where the transition from one base station 14 to another is characterized by the first base station 14 stopping communications with the mobile terminal 16 at the precise time when the second base station 14 begins communications with the mobile terminal 16. Unfortunately, hard handoffs are prone to dropping communications, and have proven to be sufficiently unreliable. Soft handoffs are characterized by multiple base stations 14 simultaneously communicating with a mobile terminal 16 during a handoff period. Typically, the same information is transmitted to the mobile terminal 16 from different base stations 14, and the mobile terminal 16 attempts to receive signals from both base stations 14 until the base station 14 to which the mobile terminal 16 is transitioning is deemed capable of taking over communications with the mobile terminal 16.

In FIG. 1, a handoff area 18 is illustrated at the junction of three cells 12, wherein a mobile terminal 16 is at the edge of any one of the three cells 12 and could potentially be supported by any of the base stations 14 within those cells 12. The present invention provides a method and architecture for facilitating soft handoff in an orthogonal frequency division multiplexing (OFDM) wireless communication environment.

Figure 2:
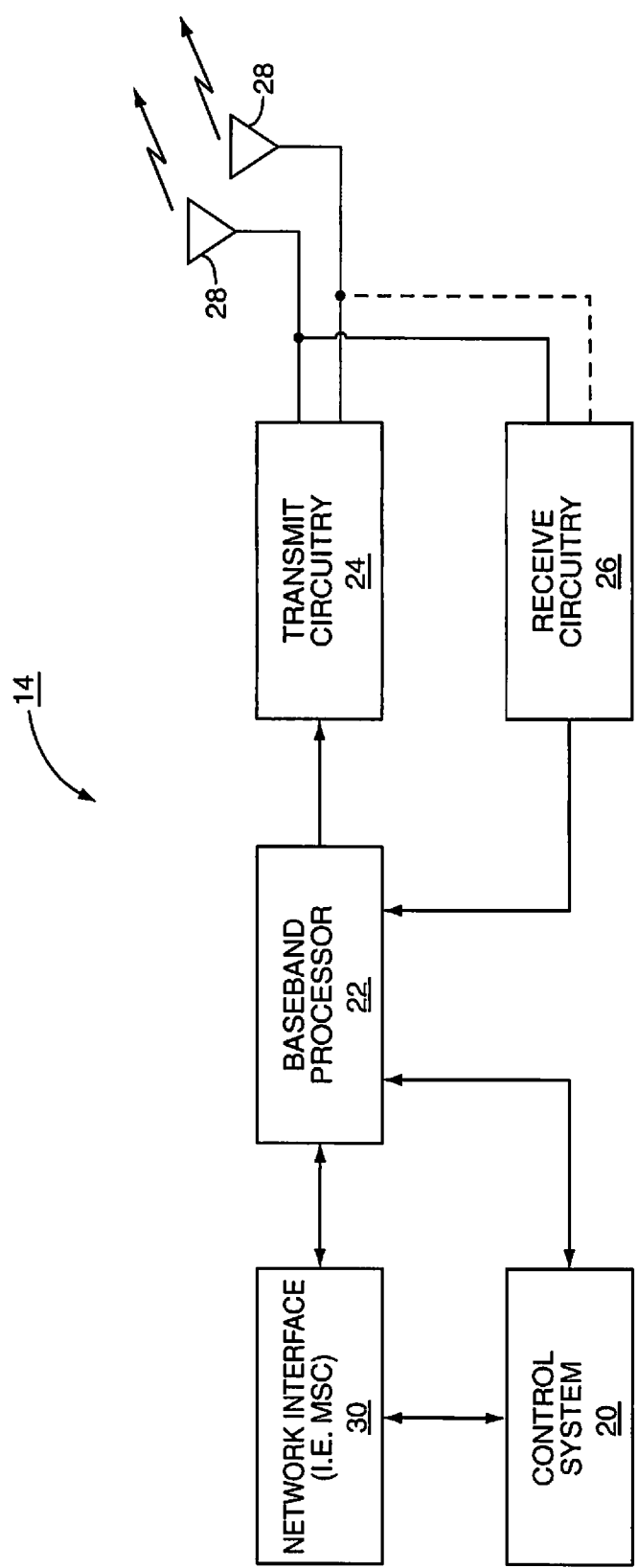
FIG. 2 is a block representation of a base station according to one embodiment of the present invention.

A high level overview of the mobile terminals 16 and base stations 14 of the present invention is provided prior to delving into the structural and functional details of the preferred embodiments. With reference to FIG. 2, a base station 14 configured according to one embodiment of the present invention is illustrated. The base station 14 generally includes a control system 20, a baseband processor 22, transmit circuitry 24, receive circuitry 26, multiple antennas 28, and a network interface 30. The receive circuitry 26 receives radio frequency signals bearing information from one or more remote transmitters provided by mobile terminals 16 (illustrated in FIG. 3). Preferably, a low noise amplifier and a filter (not shown) cooperate to amplify and remove broadband interference from the signal for processing. Downconversion and digitization circuitry (not shown) will then downconvert the filtered, received signal to an intermediate or baseband frequency signal, which is then digitized into one or more digital streams.

The baseband processor 22 processes the digitized received signal to extract the information or data bits conveyed in the received signal. This processing typically comprises demodulation, decoding, and error correction operations. As such, the baseband processor 22 is generally implemented in one or more digital signal processors (DSPs). The received information is then sent across a wireless network via the network interface 30 or transmitted to another mobile terminal 16 serviced by the base station 14. The network interface 30 will typically interact with the base station controller 10 and a circuit-switched network forming a part of a wireless network, which may be coupled to the public switched telephone network (PSTN).

On the transmit side, the baseband processor 22 receives digitized data, which may represent voice, data, or control information, from the network interface 30 under the control of control system 20, which encodes the data for transmission. The encoded data is output to the transmit circuitry 24, where it is modulated by a carrier signal having a desired transmit frequency or frequencies. A power amplifier (not shown) will amplify the modulated carrier signal to a level appropriate for transmission, and deliver the modulated carrier signal to the antennas 28 through a matching network (not shown). Modulation and processing details are described in greater detail below.

Figure 3:
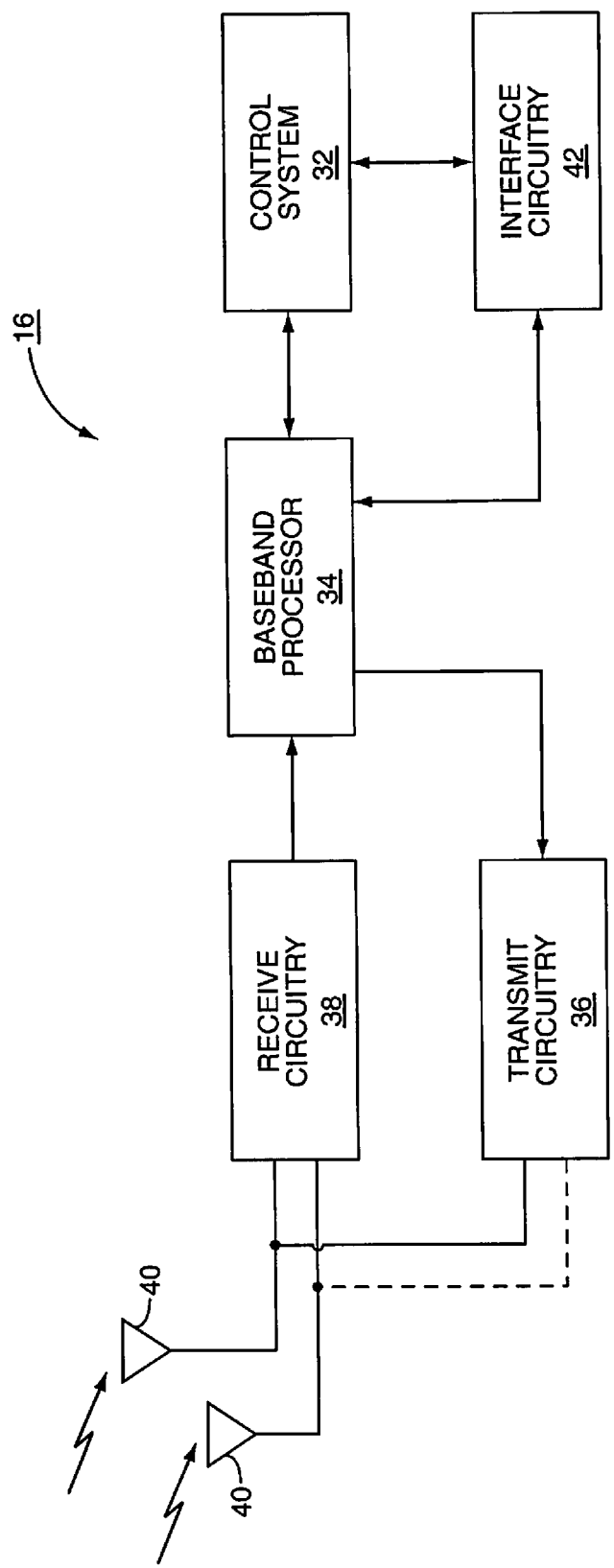
FIG. 3 is a block representation of a mobile terminal according to one embodiment of the present invention.

With reference to FIG. 3, a mobile terminal 16 configured according to one embodiment of the present invention is illustrated. Similarly to the base station 14, the mobile terminal 16 will include a control system 32, a baseband processor 34, transmit circuitry 36, receive circuitry 38, multiple antennas 40, and user interface circuitry 42. The receive circuitry 38 receives radio frequency signals bearing information from one or more base stations 14. Preferably, a low noise amplifier and a filter (not shown) cooperate to amplify and remove broadband interference from the signal for processing. Downconversion and digitization circuitry (not shown) will then downconvert the filtered, received signal to an intermediate or baseband frequency signal, which is then digitized into one or more digital streams.

The baseband processor 34 processes the digitized received signal to extract the information or data bits conveyed in the received signal. This processing typically comprises demodulation, decoding, and error correction operations, as will be discussed on greater detail below. The baseband processor 34 is generally implemented in one or more digital signal processors (DSPs) and application specific integrated circuit (ASIC).

For transmission, the baseband processor 34 receives digitized data, which may represent voice, data, or control information, from the control system 32, which it encodes for transmission. The encoded data is output to the transmit circuitry 36, where it is used by a modulator to modulate a carrier signal that is at a desired transmit frequency or frequencies. A power amplifier (not shown) will amplify the modulated carrier signal to a level appropriate for transmission, and deliver the modulated carrier signal to the antennas 40 through a matching network (not shown). Various modulation and processing techniques available to those skilled in the art are applicable to the present invention.

In OFDM modulation, the transmission band is divided into multiple, orthogonal carrier waves. Each carrier wave is modulated according to the digital data to be transmitted. Because OFDM divides the transmission band into multiple carriers, the bandwidth per carrier decreases and the modulation time per carrier increases. Since the multiple carriers are transmitted in parallel, the transmission rate for the digital data, or symbols, on any given carrier is lower than when a single carrier is used.

OFDM modulation requires the performance of an Inverse Fast Fourier Transform (IFFT) on the information to be transmitted. For demodulation, the performance of a Fast Fourier Transform (FFT) on the received signal is required to recover the transmitted information. In practice, the Inverse Discrete Fourier Transform (IDFT) and Discrete Fourier Transform (DFT) are implemented using digital signal processing for modulation and demodulation, respectively.

Accordingly, the characterizing feature of OFDM modulation is that orthogonal carrier waves are generated for multiple bands within a transmission channel. The modulated signals are digital signals having a relatively low transmission rate and capable of staying within their respective bands. The individual carrier waves are not modulated directly by the digital signals. Instead, all carrier waves are modulated at once by IFFT processing.

In the preferred embodiment, OFDM is used at least for the downlink transmission from the base stations 14 to the mobile terminals 16. Further, the base stations 14 are synchronized to a common clock via GPS signaling and coordinate communications via the base station controller 10. Each base station 14 is equipped with n transmit antennas 28, and each mobile terminal 16 is equipped with m receive antennas 40. Notably, the respective antennas can be used for reception and transmission using appropriate duplexers or switches and are so labeled only for clarity.

Figure 4:
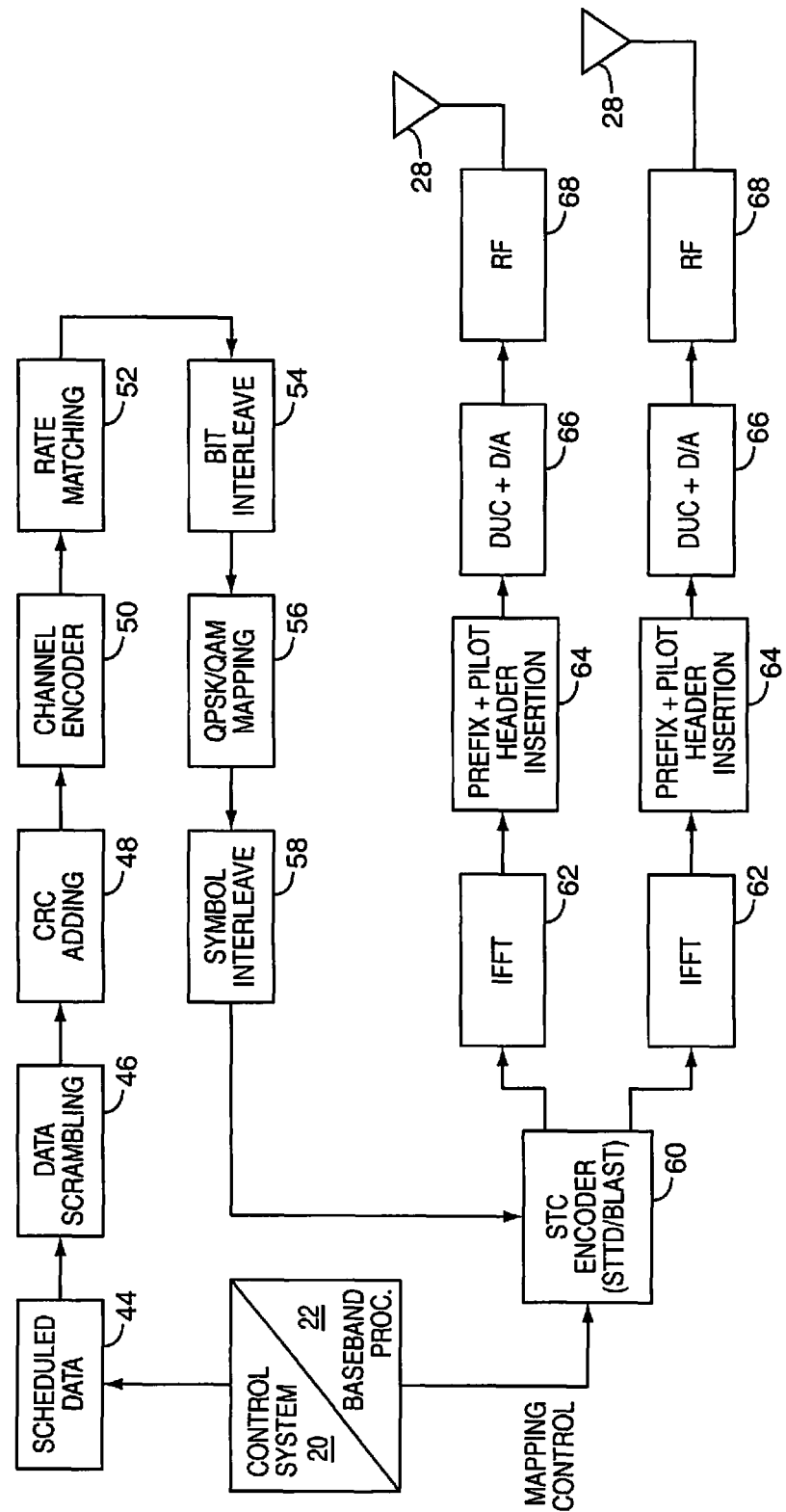
FIG. 4 is a logical breakdown of an OFDM transmitter architecture according to one embodiment of the present invention.

With reference to FIG. 4, a logical OFDM transmission architecture is provided according to one embodiment. Initially, the base station controller 10 sends data 44 to be transmitted to a mobile terminal 16 to the base station 14. The data, which is a stream of bits, is scrambled in a manner reducing the peak-to-average power ratio associated with the data using data scrambling logic 46. A cyclic redundancy check (CRC) for the scrambled data is determined and appended to the scrambled data using CRC logic 48. Next, channel coding is performed using channel encoder logic 50 to effectively add redundancy to the data to facilitate recovery and error correction at the mobile terminal 16. The channel encoder logic 50 uses known Turbo encoding techniques in one embodiment. The encoded data is then processed by rate matching logic 52 to compensate for the data expansion associated with encoding.

Bit interleaver logic 54 systematically reorders the bits in the encoded data to minimize the loss of consecutive data bits is provided by. The resultant data bits are systematically mapped into corresponding symbols depending on the chosen baseband modulation by mapping logic 56. Preferably, Quadrature Amplitude Modulation (QAM) or Quadrature Phase Shift Key (QPSK) modulation is used. The symbols may be systematically reordered to further bolster the immunity of the transmitted signal to periodic data loss caused by frequency selective fading using symbol interleaver logic 58.

At this point, groups of bits have been mapped into symbols representing locations in an amplitude and phase constellation. Blocks of symbols are then processed by space-time block code (STC) encoder logic 60, which modifies the symbols in a fashion making the transmitted signals more resistant to interference and readily decoded at a mobile terminal 16. The STC encoder logic 60 will process the incoming symbols and provide n outputs corresponding to the number of transmit antennas 28 for the base station 14. The control system 20 and/or baseband processor 22 will provide a mapping control signal to control STC encoding. Further detail regarding the STC encoding is provided later in the description. At this point, assume the symbols for the n outputs are representative of the data to be transmitted and capable of being recovered by the mobile terminal 16. See A. F. Naguib, N. Seshadri, and A. R. Calderbank, "Applications of space-time codes and interference suppression for high capacity and high data rate wireless systems," Thirty-Second Asilomar Conference on Signals, Systems & Computers, Volume 2, pp. 1803-1810, 1998, which is incorporated herein by reference in its entirety.

For the present example, assume the base station 14 has two antennas 28 (n=2) and the STC encoder logic 60 provides two output streams of symbols. Accordingly, each of the symbol streams output by the STC encoder logic 60 is sent to a corresponding IFFT processor 62, illustrated separately for ease of understanding. Those skilled in the art will recognize that one or more processors may be used to provide such digital signal processing alone or in combination with other processing described herein. The IFFT processors 62 will preferably operate on the respective symbols using IDFT or like processing to effect an inverse Fourier Transform. The output of the IFFT processors 62 provides symbols in the time domain. The time domain symbols are grouped into frames, which are associated with prefix and pilot headers by like insertion logic 64. Each of the resultant signals is up-converted in the digital domain to an intermediate frequency and converted to an analog signal via the corresponding digital up-conversion (DUC) and digital-to-analog (D/A) conversion circuitry 66. The resultant (analog) signals are then simultaneously modulated at the desired RF frequency, amplified, and transmitted via the RF circuitry 68 and antennas 28. Notably, the transmitted data is preceded by pilot signals, which are known by the intended mobile terminal 16 and implemented by modulating the pilot header and scattered pilot sub-carriers. The mobile terminal 16, which is discussed in detail below, will use the scattered pilot signals for channel estimation and interference suppression and the header for identification of the base station 14.

Figure 5:
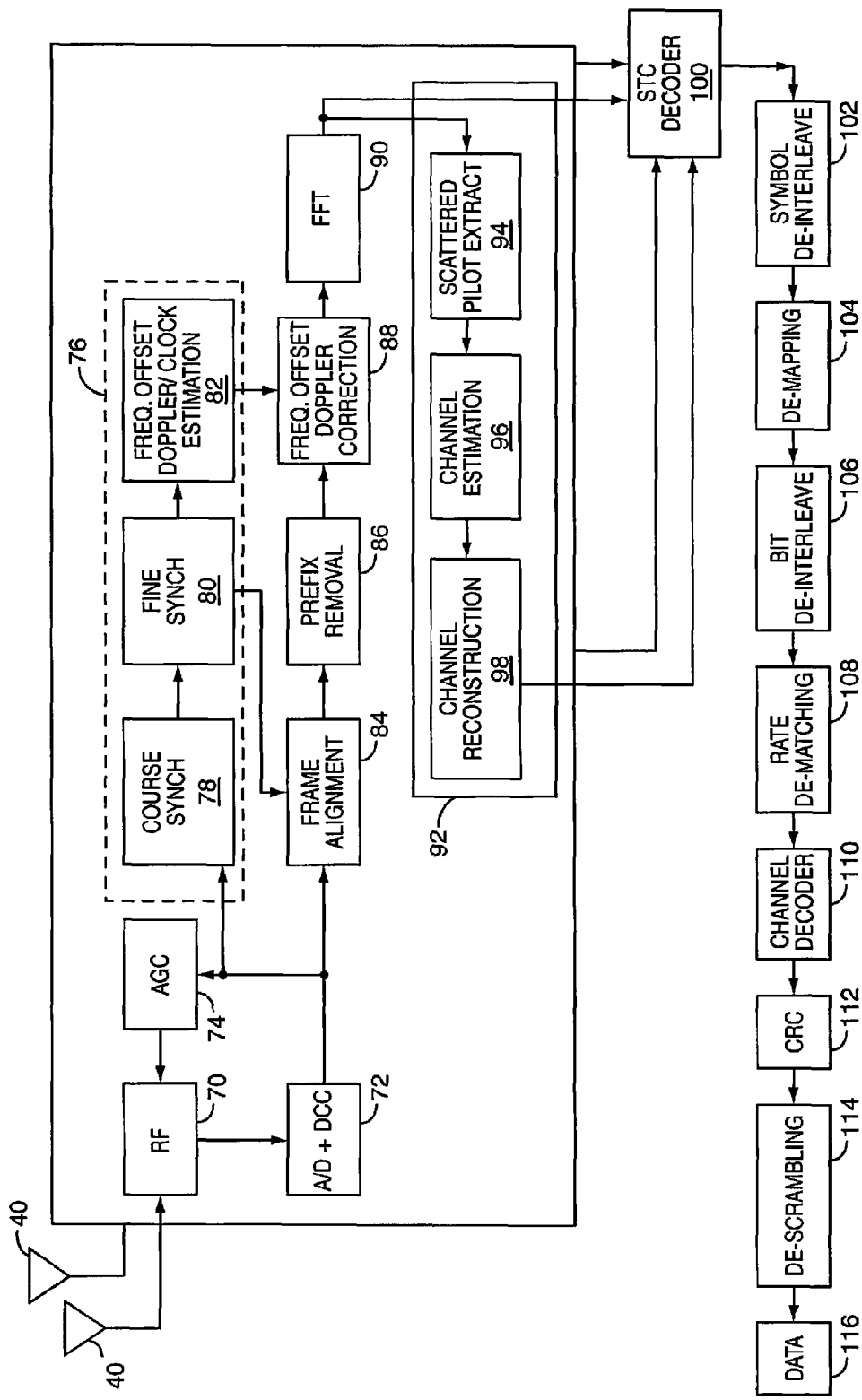
FIG. 5 is a logical breakdown of an OFDM receiver architecture according to one embodiment of the present invention.

Reference is now made to FIG. 5 to illustrate reception of the transmitted signals by a mobile terminal 16. Upon arrival of the transmitted signals at each of the antennas 40 of the mobile terminal 16, the respective signals are demodulated and amplified by corresponding RF circuitry 70. For the sake of conciseness and clarity, only one of the two receive paths is described and illustrated in detail. Analog-to-digital (A/D) converter and down-conversion circuitry 72 digitizes and downconverts the analog signal for digital processing. The resultant digitized signal may be used by automatic gain control circuitry (AGC) 74 to control the gain of the amplifiers in the RF circuitry 70 based on the received signal level.

Preferably, each transmitted frame has a defined structure having two identical headers. Framing acquisition is based on the repetition of these identical headers. Initially, the digitized signal is provided to synchronization logic 76, which includes coarse synchronization logic 78, which buffers several OFDM symbols and calculates an auto-correlation between the two successive OFDM symbols. A resultant time index corresponding to the maximum of the correlation result determines a fine synchronization search window, which is used by the fine synchronization logic 80 to determine a precise framing starting position based on the headers. The output of the fine synchronization logic 80 facilitates frame acquisition by the frame alignment logic 84. Proper framing alignment is important so that subsequent FFT processing provides an accurate conversion from the time to the frequency domain. The fine synchronization algorithm is based on the correlation between the received pilot signals carried by the headers and a local copy of the known pilot data. Once frame alignment acquisition occurs, the prefix of the OFDM symbol is removed with prefix removal logic 86 and a resultant samples are sent to frequency offset and Doppler correction logic 88, which compensates for the system frequency offset caused by the unmatched local oscillators in the transmitter and the receiver and Doppler effects imposed on the transmitted signals. Preferably, the synchronization logic 76 includes frequency offset, Doppler, and clock estimation logic, which is based on the headers to help estimate such effects on the transmitted signal and provide those estimations to the correction logic 88 to properly process OFDM symbols.

At this point, the OFDM symbols in the time domain are ready for conversion to the frequency domain using the FFT processing logic 90. The results are frequency domain symbols, which are sent to processing logic 92. The processing logic 92 extracts the scattered pilot signal using scattered pilot extraction logic 94, determines a channel estimate based on the extracted pilot signal using channel estimation logic 96, and provides channel responses for all sub-carriers using channel reconstruction logic 98. The frequency domain symbols and channel reconstruction information for each receive path are provided to an STC decoder 100, which provides STC decoding on both received paths to recover the transmitted symbols. The channel reconstruction information provides the STC decoder 100 sufficient information to process the respective frequency domain symbols to remove the effects of the transmission channel.

The recovered symbols are placed back in order using the symbol de-interleaver logic 102, which corresponds to the symbol interleaver logic 58 of the transmitter. The de-interleaved symbols are then demodulated or de-mapped to a corresponding bitstream using de-mapping logic 104. The bits are then de-interleaved using bit de-interleaver logic 106, which corresponds to the bit interleaver logic 54 of the transmitter architecture. The de-interleaved bits are then processed by rate de-matching logic 108 and presented to channel decoder logic 110 to recover the initially scrambled data and the CRC checksum. Accordingly, CRC logic 112 removes the CRC checksum, checks the scrambled data in traditional fashion, and provides it to the de-scrambling logic 114 for de-scrambling using the known base station de-scrambling code to recover the originally transmitted data.

Since OFDM is a parallel transmission technology, the entire useful bandwidth is divided into many-sub-carriers, which are modulated independently. A common synchronization channel, a pilot channel, and a broadcasting channel are multiplexed into the header of the OFDM symbol in the frequency domain based on the sub-carrier position. The common synchronization channel is used for initial acquisition for timing synchronization, frequency and Doppler estimation, and initial channel estimation.

In one embodiment, 256 common synchronization sub-carriers are further divided between the respective transmission paths wherein each path is associated with 128 common synchronization sub-carriers, respectively. A common complex PN code of size 256, which is shared by both transmit paths, is used to modulate the sub-carriers reserved for the common synchronization channels.

The pilot channel is used for synchronization, initial channel estimation, base station identification, and carrier-to-interference ratio (CIR) measurements for cell (or base station) selection. In one embodiment, 256 sub-carriers are reserved for dedicated pilots wherein each transmission path has 128 pilot sub-carriers. A unique complex PN code with length 256 is assigned to each base station 14 and mapped to these dedicated pilots. The orthogonality of the PN codes assigned to the different base stations 14 provides for base station identification and initial interference measurement.

In one embodiment, the frame structure has two identical header symbols at the beginning of every 10 ms frame. The framing acquisition is based on the repeated headers. When turned on, the mobile terminal 16 will start the time domain coarse synchronization processing. A running buffer is used to buffer several OFDM symbols, and then calculate the auto-correlation between two successful OFDM symbols. The coarse synchronization position is the time index corresponding to the maximum output of the auto-correlations.

After framing acquisition, only the rough range of the location of the starting position of the first header symbol is known. To perform OFDM modulation in the frequency domain, the starting location of OFDM symbol must be exact so the FFT can transfer the signals from the time domain to the frequency domain. Accordingly, the location of the first sample in the first header of the OFDM symbol is determined. Fine synchronization is based on the correlation between the pilot data in the headers of the received signals and a local copy of the known pilot data.

With regard to channel estimation, each sub-band, which is represented by a modulated sub-carrier, only covers a small fraction of the entire channel bandwidth. The frequency response over each individual sub-band is relatively flat, which makes coherent demodulation relatively easy. Since the transmission channel corrupts the transmitted signal in amplitude and phase, reliable channel knowledge is required to perform coherent detection. As noted, one embodiment uses a pilot signal for channel parameter estimation to keep track of channel characteristics caused by the movement of the mobile terminal 16. Accordingly, scattered pilot signals are inserted in a regular pattern. The pilot signals are periodically interpolated to obtain current channel information required for STC decoding.

Based on the above, system access is characterized as follows. Initially, coarse synchronization correlation is performed based on the preamble header in the time domain to determine a coarse synchronization location. At the coarse synchronization location, a fine synchronization search window is identified. An FFT is computed, and the system switches to the common synchronization channel to perform fine synchronization within the fine synchronization search window. Next, the strongest correlation peaks are identified, and the relevant time index are used as the candidate timing synchronization positions. An FFT is computed at each candidate timing synchronization position, and the system switches to the pilot channel.

The PN sequences for all base stations 14 are correlated, and correlation peaks are selected to define an index corresponding to all candidate timing synchronization positions. The CIRs for these base stations 14 are identified. The base station with highest CIR is selected as the serving base station, and the base stations 14 with CIRs greater than a given threshold are also selected for the active set list. If more than one base station 14 is on the active set list, the soft handoff procedures of the present invention are initiated. The FFT is then computed and the fine synchronization is provided using the PN code for each of the selected base station(s) 14.

During operation, the transmitter architecture of the mobile terminal 16 will facilitate system access as follows. In general, downlink communications from a base station 14 to a mobile terminal 16 are initiated by the mobile terminal 16. Each mobile terminal 16 constantly measures all of the possible pilot signal strengths of transmissions from adjacent base stations 14, identifies the strongest pilot signals, and compares them against a defined threshold. If the pilot signal strength for a base station 14 exceeds the defined threshold, that base station 14 is added to an active set list. Each mobile terminal 16 will notify the base stations 14 of their active set lists. If there is only one base station 14 in the active set list, that base station 14 is singled out to service the mobile terminal 16. If there is more than one base station 14 on the active set list, a soft handoff is enabled between those base stations 14. The soft handoff condition will continue until only one base station 14 is on the active set list, wherein the lone base station 14 will continue to serve the mobile terminal 16. During soft handoff, all base stations 14 on the active set list will facilitate communications with the mobile terminal 16 as defined below. Preferably, the base station controller 10 keeps track of all of the active set lists for the respective mobile terminals 16. The mobile terminals 16 will keep track of their individual set lists.

Accordingly, by providing the set list to the base station controller 10 and the servicing base station 14, the mobile terminal 16 identifies the sole servicing base station 14 or triggers a soft handoff (SHO) mode when multiple base stations appear on the active set list. The SHO mode uses a combination of scheduling and STC coding to affect efficient and reliable handoffs. During a SHO mode, the base station controller 10 either multicasts or non-multicasts data packets intended for the mobile terminal 16 to each of the base stations 14 on the active set list. Multicasting indicates that each data packet is sent to each base station 14 on the active set list for transmission to the mobile terminal 16. Non-multicasting indicates that data packets are divided into to sub-packets in some manner and each sub-packet is sent to one of the base stations 14 on the active set list for transmission to the mobile terminal 16. Unlike multicasting, redundant information is not transmitted from each base station 14 on the active set list.

In either multicasting or non-multicasting embodiments, the base stations 14 provide STC encoding of the transmitted data and the mobile terminals 16 provide corresponding STC decoding to recover the transmitted data. The STC coding may be either space-time-transmit diversity (STTD) or V-BLAST-type coding. STTD coding encodes data into multiple formats and simultaneously transmits the multiple formats with spatial diversity (i.e. from antennas 28 at different locations). V-BLAST-type coding separates data into different groups and separately encodes and simultaneously transmits each group with spatial diversity. Other coding will be recognized by those skilled in the art. The mobile terminal 16 will separately demodulate and decode the transmitted data from each base station 14, and then combine the decoded data from each base station 14 to recover the original data.

The following illustrates an exemplary process for identifying base stations 14 to place in the active set list, scheduling of data at the base stations 14, and STC coding for transmission of scheduled data from the base stations 14 to the mobile terminals 16.

For a multiple-input-multiple-output (MIMO) OFDM system as illustrated in FIG. 1, the pilot signal is embedded in the preamble of each frame for each base station 14. The mobile terminal 16 can identify each base station 14 based on the pseudo-noise sequence of the pilot signal. The mobile terminal 16 is able to measure the carrier-to-interference ratio (CIR) based on the pilot signal for each adjacent base station 14. Based on the strength of the pilot signal, the mobile terminal 16 can determine the active set list. If more than one base station 14 is on the active set list, the mobile terminal 16 will trigger SHO procedure through the uplink signaling with the base station 14, which will communicate the same to the base station controller 10.

With reference to FIG. 6, an exemplary active set list for a communication environment is shown. Assume that a single base station controller 10 controls the operation of nine base stations, BS1-BS9. Further assume that there are fifteen mobile terminals 16 identified as mobile terminals A-O within the communication environment, and that all of the mobile terminals (A-O) are in handoff areas from which service may be provided by two or three of the base stations BS1-BS9. The shaded areas of the active set list tables identify the active set lists of base stations BS1-BS9 for each of the mobile terminals A-O. In the present example, mobile terminals A, B, F, G, K, and L are involved in a two-way SHO procedure wherein two of the base stations BS1-BS9 are on the corresponding mobile terminals' active set lists. Similarly, mobile terminals C, D, E, H, I, J, M, N, and O are in a three-way SHO procedure, wherein three of the base stations BS1-BS9 are on the corresponding mobile terminals' active set lists. For example, the active set list of mobile terminal B identifies base stations BS3 and BS5 and the active set list for mobile terminal H identifies base stations BS1, BS6, and BS7. As noted, once these mobile terminals A-O determine that there are multiple base stations BS1-BS9 on the active set list, the mobile terminal 16 will trigger a SHO procedure through uplink signaling with its currently servicing base station 14. The base station 14 will alert the base station controller 10, which will begin the SHO procedure.

Prior OFDM handoffs were hard handoffs, and the servicing base station 14 handled scheduling of data for transmission for any given mobile terminal 16 autonomously. Since only one base station 14 served a mobile terminal 16 at any one time, there was no need to employ joint scheduling. In contrast, the present invention employs joint scheduling for base stations 14 on the active set list of a mobile terminal 16. As such, the base station controller 10 and not the serving base station 14 is used to schedule data packets for transmission during the SHO mode for each mobile terminal 16. Although the base station controller 10 may provide all scheduling for associated base stations 14, the preferred embodiment of the present invention delegates scheduling of data for mobile terminals 16 that are not in the SHO mode to the servicing base station 14.

In order to minimize the complexity of the system, the base station controller 10 classifies the active mobile terminals 16 into two categories: (1) SHO and (2) non-SHO. For a non-SHO mobile terminal 16, each base station 14 will schedule packet transmissions independently based on the channel quality reported at that particular base station 14 by the mobile terminal 16. For example, the scheduling may be based on maximum CIR scheduling, round robin scheduling, or any other scheduling provision known in the art. For a SHO mobile terminal 16, the base station controller 10 may use a simple round robin scheduler and may either multicast or non-multicast the packets to the base stations 14 on the active set list at a given time slot.

For multicast, each data packet is sent to each base station 14 on the active set list for transmission to the mobile terminal 16. For non-multicast, data packets are divided into to sub-packets in some manner and each sub-packet is sent to one of the base stations 14 on the active set list for transmission to the mobile terminal 16. In the latter case, there is no redundancy among the bases stations 14. Each base station 14 sends a unique piece of the data being transmitted. When SHO-mode scheduling is not required, the serving base stations 14 will schedule and transmit data to mobile terminals 16 in the non-SHO mode. The round robin scheduling provided by the base station controller 10 for a mobile terminal 16 in SHO mode can be determined by the ratio of the number of SHO-mode mobile terminals to the non-SHO-mode mobile terminals 16. Alternatively, the scheduling may be controlled to maximize capacity, minimize delay, etc. The packet transmission for a SHO mode can be signaled via fast downlink signaling.

Figure 7A:
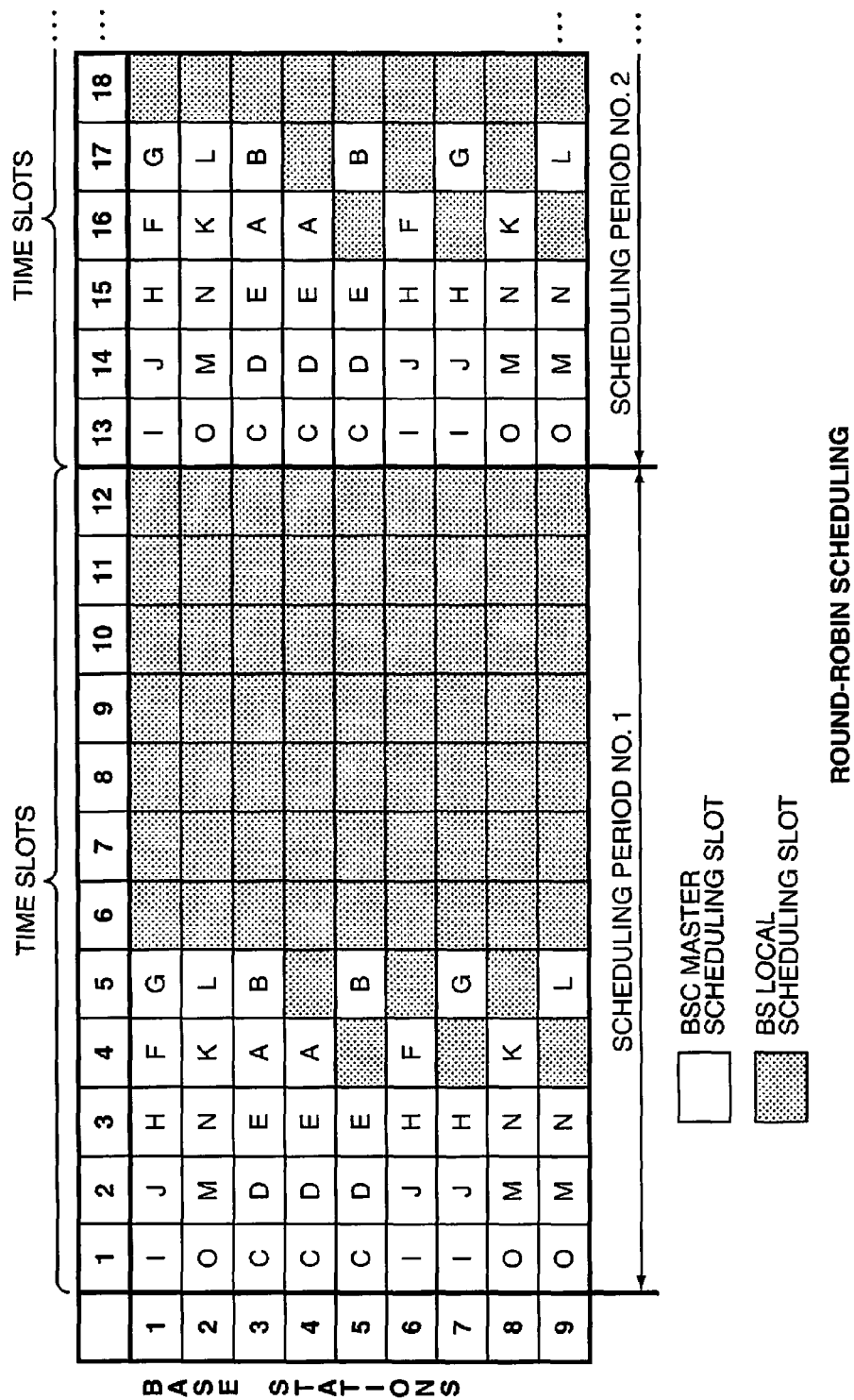
FIG. 7A is a table illustrating round robin scheduling.

An exemplary round robin scheduling technique for the base station controller 10 is illustrated in FIG. 7A in light of the active set list information provided in FIG. 6. As depicted, communications between a base station 14 and a mobile terminal 16 are assigned to a given time slot in a scheduling period. The base station controller 10 schedules communications for designated time slots for mobile terminals 16 operating in a SHO mode and leaves the shaded time slots open for traditional, non-SHO mode scheduling at the respective base stations 14. Accordingly, the base station controller 10 will schedule data to be sent to each of the base stations 14 participating in a SHO mode with a given mobile terminal 16 for a common time slot. For example, data to be transmitted to mobile terminal I is scheduled for time slot 1 for base stations BS1, BS6, and BS7. Data to be transmitted to mobile terminal C is scheduled for time slot 1 and sent to base stations BS3, BS4, and BS5. Similarly, data to be transmitted to mobile terminal O is also scheduled for time slot 1 and delivered to base stations BS2, BS8, and BS9 on its active set list. Thus, data to be transmitted to a mobile terminal 16 in a SHO mode is scheduled for a common time slot for each of the base stations 14 in the active set list. To minimize the processing required for round robin scheduling, the allocation of time slots for the various mobile terminals 16 participating in the SHO mode are kept consistent from one scheduling period to the next until there is a change in the active set list for one or more of the mobile terminals 16. As illustrated, the allocation of communications for the mobile terminals 16 for time slot 1 and 13 are identical, and so on and so forth. Once the base stations 14 provide the multicasting or non-multicasting of the SHO mode data, the base stations 14 can provide scheduling during the shaded time slots for mobile terminals 16 that are not operating in the SHO mode.

Figure 7B:
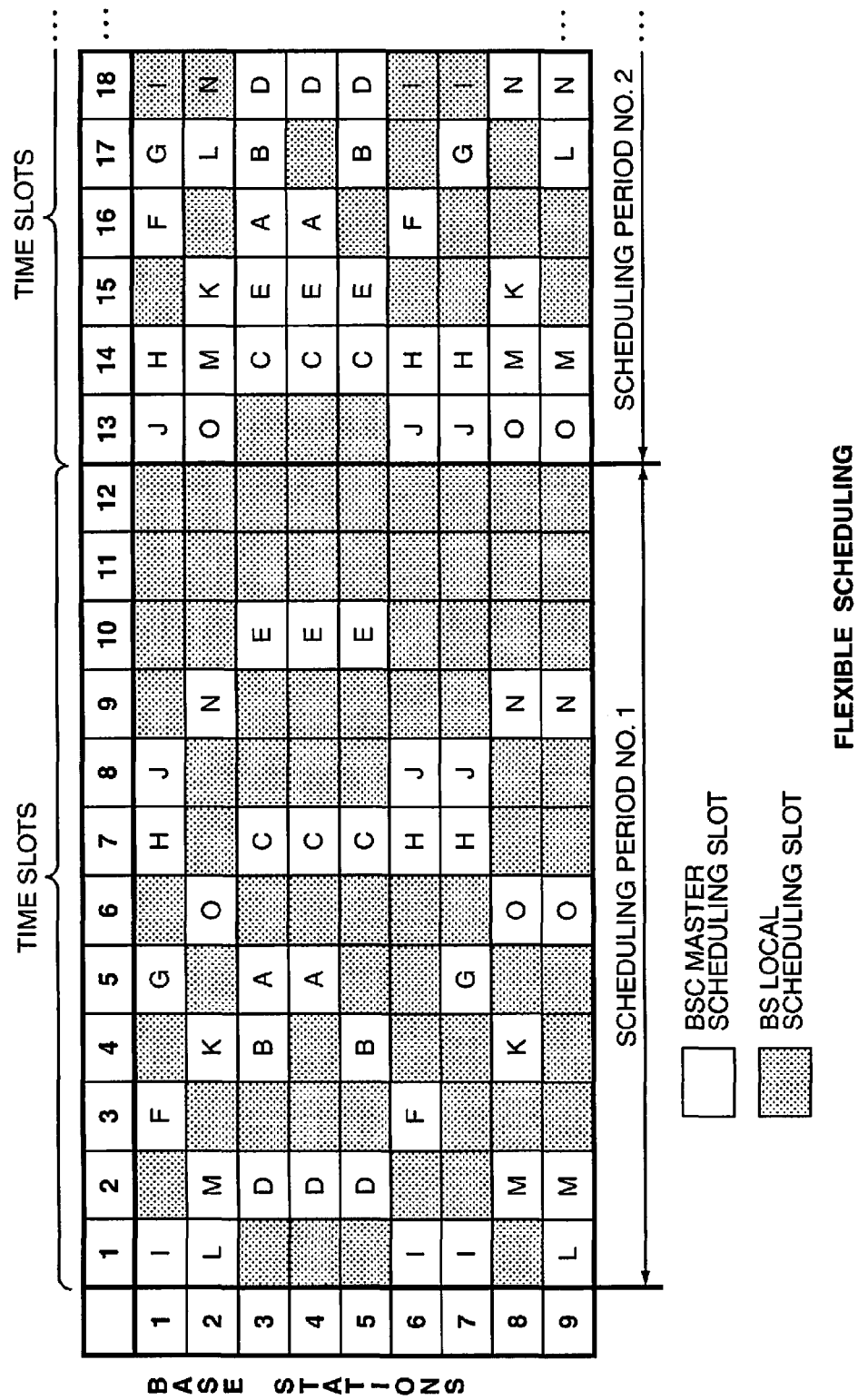
FIG. 7B is a table illustrating flexible scheduling.

FIG. 7B illustrates an alternative scheduling arrangement, wherein the scheduling for SHO mode and non-SHO mode mobile terminals 16 is not repeated from one scheduling period to another, but is recomputed and reassigned during each scheduling period. During time slot 1, data to be transmitted to mobile terminal I is sent to base stations BS1, BS6, and BS7, wherein data to be transmitted to mobile terminal L is sent to base stations BS2 and BS9. Base stations BS3, BS4, BS5, and BS8 are free to schedule data to non-SHO mode mobile terminals 16. Corresponding time slot 13 in the subsequent scheduling period does not parallel the allocations of time slot 1. The base station controller 10 will compute a different scheduling and slot allocation procedure for the scheduling period, wherein mobile terminals J and O, which are operating in the SHO mode, are scheduled to have data transmitted to base stations BS1, BS6, and BS7, and base stations BS2, BS8, and BS9, respectively. Those skilled in the art will recognize the numerous ways to facilitate scheduling for SHO mode terminals via the base station controller 10 while allocating time slots for the base stations 14 to provide scheduling for mobile terminals not operating in a SHO mode.

Regardless of scheduling techniques, each base station 14 on the active set will perform the space-time coding at the same time during the assigned time slot. Accordingly, the mobile terminal 16 will receive the entire space-time coded data packet transmitted from the multiple base stations 14. The mobile terminal 16 will separately demodulate and decode the transmitted data from each base station 14, and then combine the decoded data from each base station 14 to recover the original data.

Figure 8A:
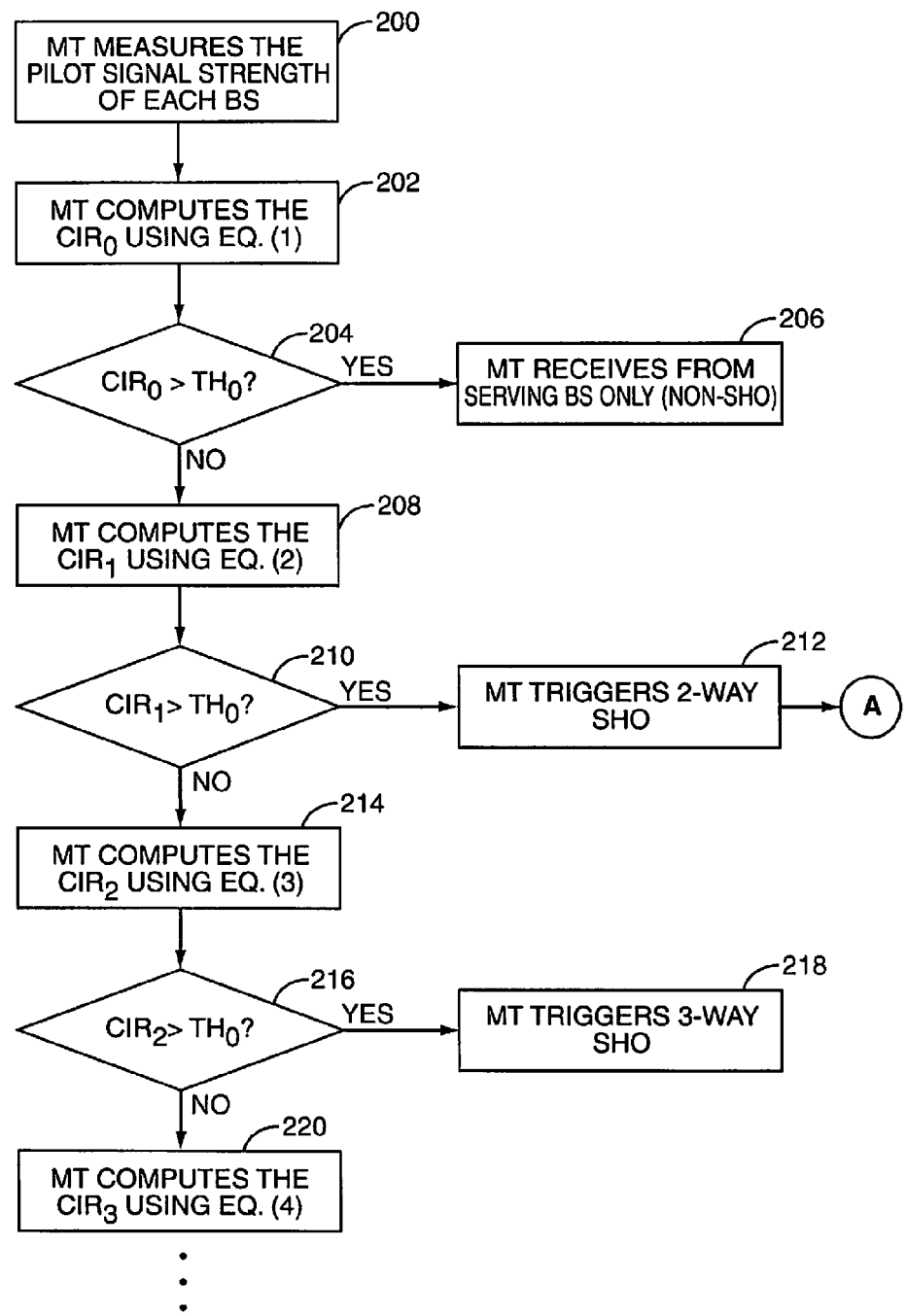
FIGS. 8A-8C are a flow diagram outlining an exemplary operation of the present invention.
Figure 8B:
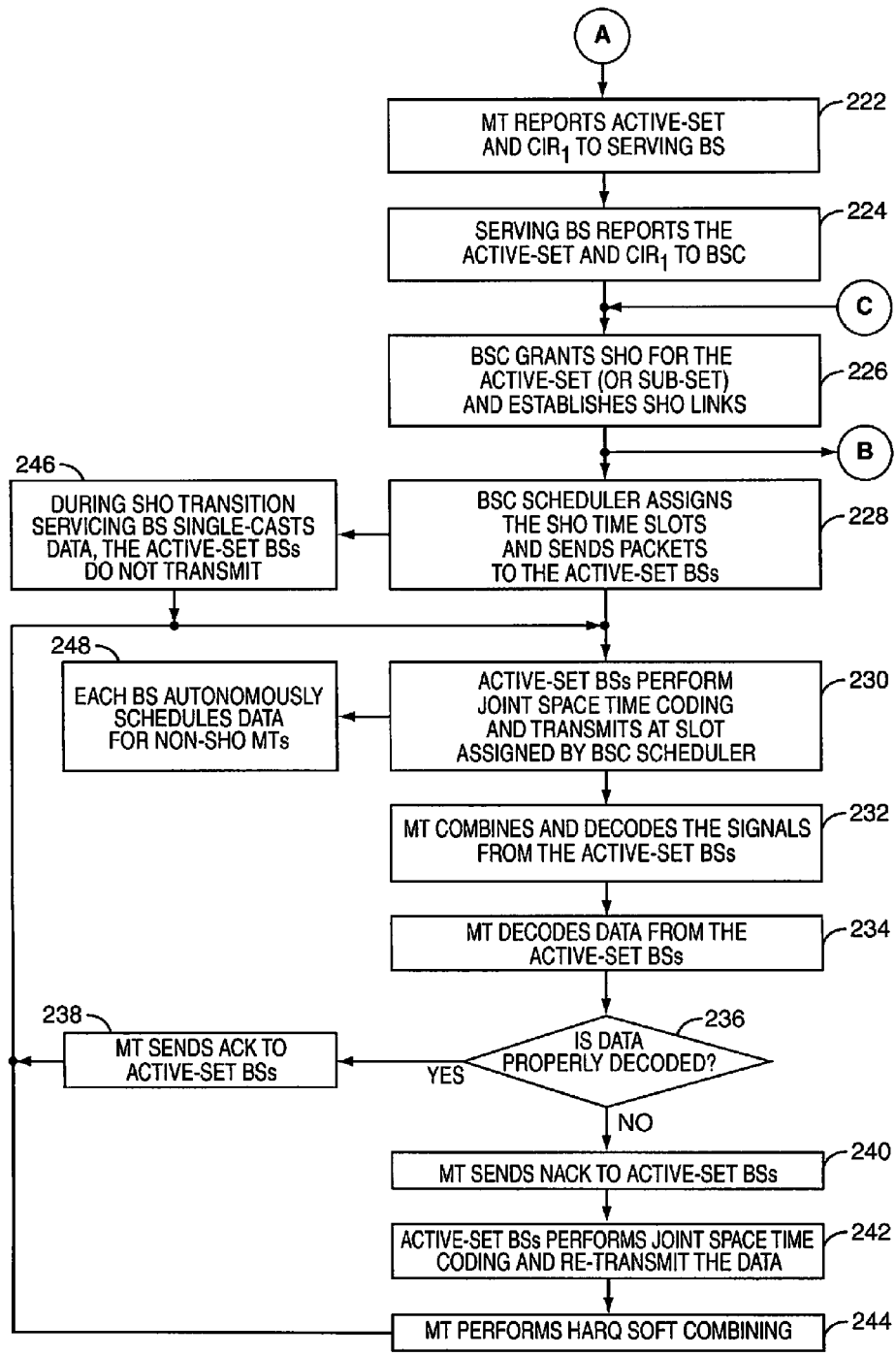
Figure 8C:
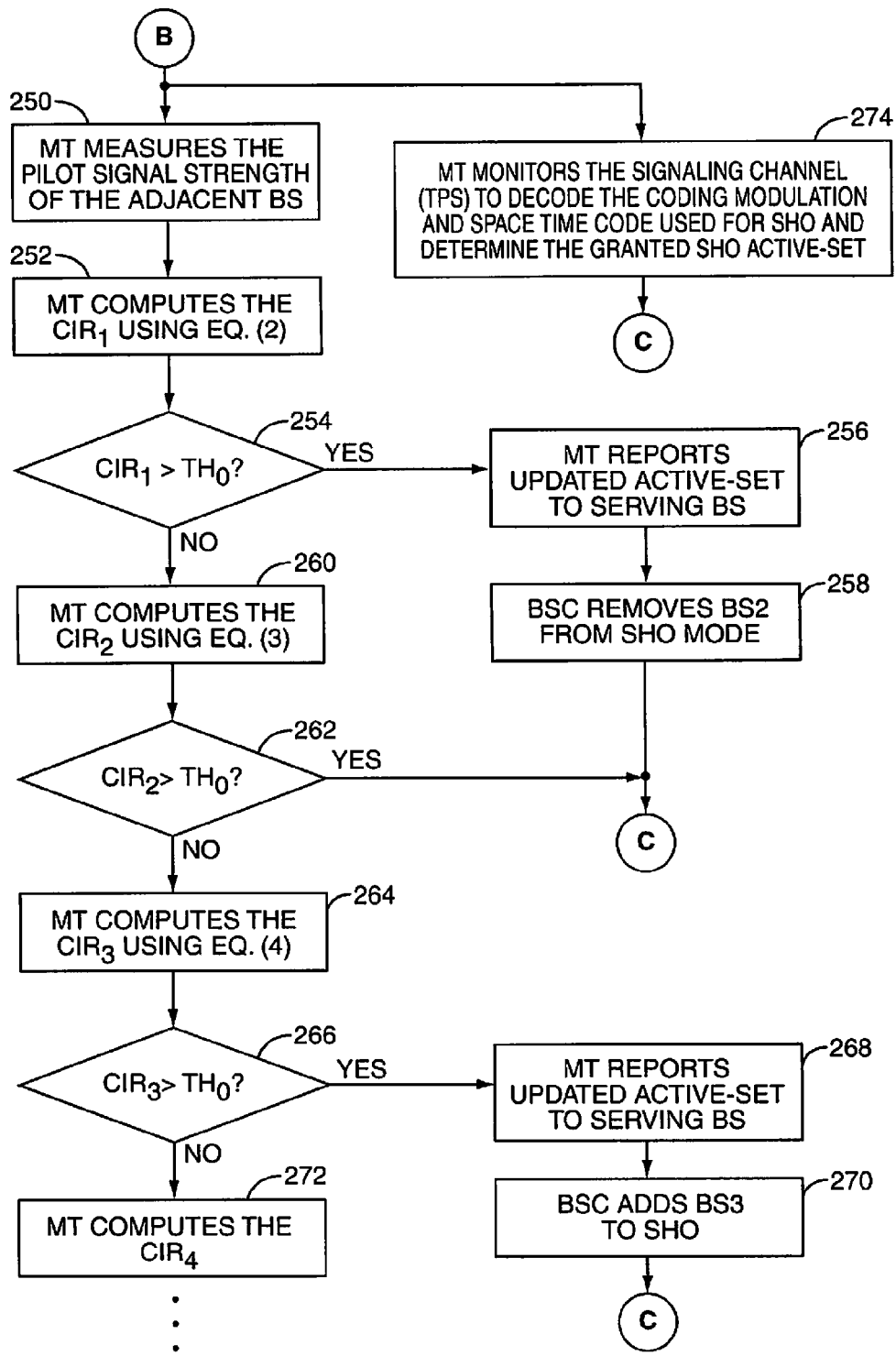

With reference to FIGS. 8A-8C, an exemplary flow of an active SHO process is described. Initially, a mobile terminal 16 will measure the pilot signal strength of each base station (step 200) and compute the carrier-to-interference ratio (CIR) using equation 1 (step 202).

$$CIR_0 = C/(I_1 + I_2 + I_3 + \ldots + I_N),$$ Equation 1 wherein C is a measure of the pilot signal strength of the servicing base station 14 and $I_1$ through $I_N$ are measures of the pilot signal strengths for adjacent base stations 14 (BS1 through BSN). If the computed CIR is greater than a threshold CIR ($Th_0$) (step 204), the mobile terminal 16 will maintain the servicing base station 14 in the active set list, and not add any of the adjacent base stations 14 to the active set list. Thus, the mobile terminal 16 will receive communications only from the servicing base station 14 and will not be in a SHO mode (step 206). If the computed CIR is not greater than the threshold CIR $Th_0$, the mobile terminal 16 will compute another CIR using equation 2 (step 208).

$$CIR_1 = (C + I_1)/(I_2 + I_3 + \ldots + I_N).$$ Equation 2

If $CIR_1$ is greater than the threshold CIR (step 210), the mobile terminal 16 will trigger a two-way SHO between the servicing base station 14 and the adjacent base stations 14 from which $I_1$ was measured (step 212). If $CIR_1$ was not greater than the threshold CIR (step 210), then the mobile terminal 16 computes another CIR using equation 3 (step 214).

$$CIR_3 = (C + I_1 + I_2 + I_3)/(I_4 + \ldots + I_N),$$ Equation 3

If $CIR_2$ is greater than the threshold CIR (step 216), the mobile terminal 16 will trigger a three-way SHO mode with the servicing base station 14 and the adjacent base stations 14 associated with $I_1$ and $I_2$ (step 218). If $CIR_2$ is not greater than the threshold CIR (step 216), the mobile terminal 16 will compute a new CIR according to equation 4 (step 220), $$CIR_3 = (C + I_1 + I_2 + I_3)/(I_4 + \ldots + I_N),$$ Equation 4 and the process will continue by adding an adjacent interference component from adjacent base stations 14 until a sufficient, combined CIR exceeds the threshold CIR $Th_0$.

For the present example, assume that a two-way SHO procedure was triggered wherein the flow moves to FIG. 8B. Once the mobile terminal 16 achieves a CIR greater than the threshold CIR, it will send information identifying the base stations 14 on the active set list and the calculated CIR to the serving base station 14 (step 222). The serving base station 14 will report the active set list and the calculated CIR to the base station controller 10 (step 224). The base station controller 10 grants the SHO mode for the base stations 14 on the active set list or a subset thereof, and establishes SHO procedure with the appropriate base stations 14 (step 226). The scheduler at the base station controller 10 will assign time slots for the SHO mode as described above, and will send data packets to the base stations 14 on the active set list or a subset thereof (step 228). The base stations on the active set list will perform the joint space-time coding and transmit data at slots assigned by the scheduler of the base station controller 10 (step 230).

Next, the mobile terminal 16 will combine and decode the signals from the base stations 14 on the active set list, and will attempt to decode the transmitted data (step 232). The mobile terminal 16 will then attempt to decode the data received from the base stations 14 on the active set list (step 234). If the data is properly decoded (step 236), the mobile terminal 16 will send an acknowledgement (ACK) to the base stations 14 on the active set list (step 238).

If the data is not properly decoded (step 236), the mobile terminal 16 will send a negative-acknowledgement (NACK) to the base stations 14 on the active set list (step 240). In response, the base stations 14 on the active set list will perform joint space-time coding and re-transmit the data (step 242). The mobile terminal 16 may then perform an automatic repeat request (ARQ) or hybrid ARQ (HARQ) soft combining (step 244), and the process will repeat.

During the transition to a SHO mode, the servicing base station 14 will have data that needs to be transmitted and will not be able to be scheduled for multicast or non-multicast transmission by the base station controller 10. Accordingly, the servicing base station 14 must transmit the residual data to the mobile terminal 16 prior to fully entering the SHO mode. In one embodiment, a single-cast technique is used where the servicing base station 14 transmits the residual data to the mobile terminal 16 and the other base stations 14 on the active set list do not transmit information in the channels or bands used by the servicing base station 14. Additional information on single-casting is provided in greater detail later in this specification. Referring again to FIG. 8B, during transition to a SHO mode, the servicing base station 14 will single-cast data to the mobile terminal 16 wherein the other base stations on the active set list will not transmit (step 246). Further, throughout the process of scheduling data for SHO mode mobile terminals 16, each base station 14 will autonomously schedule data for non-SHO mode mobile terminals 16 (step 248).

With reference to FIG. 8C, throughout the process, the mobile terminal 16 will continue to measure the pilot signal strength of all the adjacent base stations 14 (step 250) and calculate CIRs. Accordingly, the mobile terminal 16 may compute the CIR using equation 2 (step 252), and determine if the resultant CIR is greater than the threshold CIR $Th_0$ (step 254). If $CIR_1$ is greater than threshold CIR $Th_0$ (step 254), the mobile terminal 16 will update and report the active set list to the servicing base station 14 (step 256). Further, the base station controller 10 will remove base station BS2 from the SHO mode for the mobile terminal 16 (step 258). The base station BS2 is removed because the CIR of the servicing base station 14 is sufficient without use of base station BS2. Accordingly, the process will continue with step 226 of FIG. 8B.

If the value of $CIR_1$ was not greater than threshold CIR $Th_0$ (step 254), the mobile terminal 16 will compute CIR using equation 3 (step 260). If the value of $CIR_2$ is greater than threshold CIR $Th_0$ (step 262), the two-way SHO mode is still necessary, and the process will continue at step 226 of FIG. 8B. If the value of $CIR_2$ is not greater than the threshold CIR $Th_0$ (step 262), the mobile terminal 16 will compute the value of the CIR using equation 4 (step 264). Accordingly, if the value of $CIR_3$ is not greater than threshold CIR $Th_0$ (step 266), the mobile terminal 16 will compute the value of $CIR_4$ (step 272), and so on and so forth until a sufficient number of base stations 14 are added to the active set list to cause the value of CIR to exceed the threshold CIR $Th_O$.

If the value of $CIR_3$ is greater than the threshold CIR $Th_O$ (step 266), the mobile terminal 16 will update the active set list to include the base station BS3 associated with $I_3$ and report the updated active list to the service base station 14 (step 268). At this point, the base station controller 10 will add the base station BS3 to the SHO mode (step 270), and the process will continue at step 226 of FIG. 8B.

Figure 9:
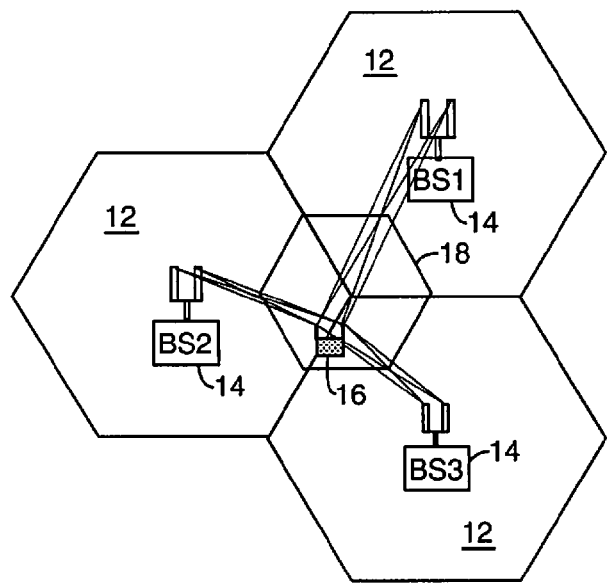
FIG. 9 is a block representation of a cellular communication system constructed according to one embodiment of the present invention.
Figure 10:
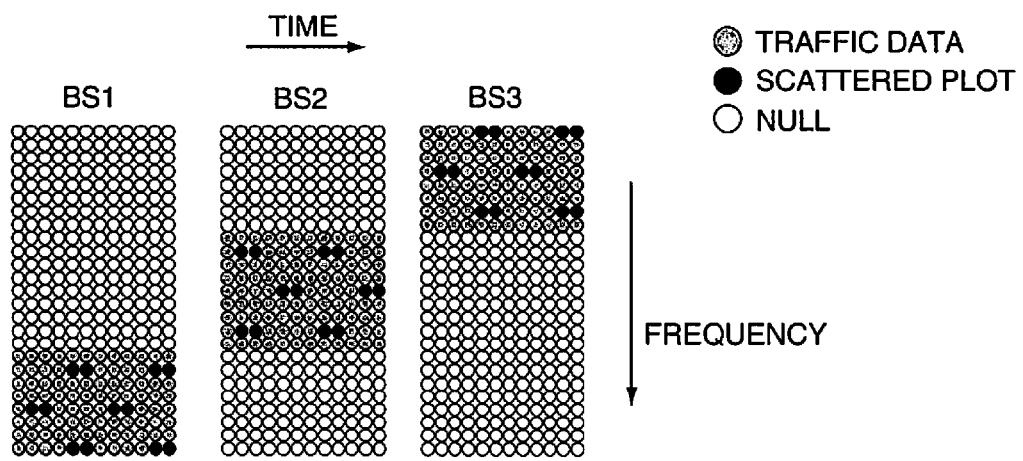
FIG. 10 is a diagram of frequency sub-band usage according to the embodiment of FIG. 9.

The data is transmitted from the base stations 14 to the mobile terminals 16 using unique space-time coding schemes. The following outlines two space-time-coding schemes involving transmission division in the frequency domain at each base station 14. For each scheme, two embodiments are described. FIGS. 9 and 10 illustrate a MIMO-OFDM scheme for a mobile terminal 16 in a SHO-mode involving three base stations 14 (BS1, BS2, and BS3). Transmission division in the frequency domain is implemented in combination with space-time coding at each base station 14. Such transmission division involves segregating the available OFDM frequency sub-bands among the participating base stations 14. Each base station 14 only modulates the data it has been scheduled to transmit on the corresponding sub-bands. FIG. 10 illustrates the sub-band mapping among the three base stations 14 (BS1, BS2, and BS3) for one path of a dual path implementing space-time coding for a given period of time. The other path will use the same sub-bands, but implement different coding. The mapping control signal (FIG. 4) is used to control mapping of the sub-bands. The base stations 14 are coordinated via the base station controller 10 to select different sub-bands for mapping control and STC encoding, as described herein, and to control power boosting.

For the first base station 14 (BS1), the bottom third of the sub-bands are used to modulate and transmit traffic data wherein the remaining two-thirds of the sub-bands are unused. Notably, the pilot signal is scattered throughout the traffic data, but not throughout the unused sub-bands. For the second base station 14 (BS2), the middle third of the sub-bands are used to modulate and transmit traffic data wherein the remaining two-thirds of the sub-bands are unused. For the third base station 14 (BS3), the top third of the sub-bands are used to modulate and transmit traffic data wherein the remaining two-thirds of the sub-bands are unused. For optimal performance, the power is boosted for the active sub-bands to realize the full power transmission and cut for the unused bands. Accordingly, the mobile terminal 16 will effectively receive a different third of the frequency bands from each of the base stations 14 (BS1, BS2, and BS3) and recover the corresponding data based on the STC and scheduling parameters. Preferably, the average power for the entire band remains within defined limits.

For non-multicast scheduling, different subpackets are sent to each base station 14 (BS1, BS2, and BS3), which will organize the data to effect the frequency division mapping and provide the space-time coding for two antennas as described above. Accordingly, each base station 14 is transmitting unique data. Each active sub-band is power boosted by $10 \log_{10}(x)$ dB, where x is the number of base stations 14 in SHO mode and is equal to three in this example. The mobile terminal 16 receives the entire frequency band, a portion from each base station 14, and performs space-time decoding to retrieve the packet data.

For non-multicast scheduling, the same packets are sent to each base station 14 (BS1, BS2, and BS3), which will organize the data to effect the frequency division mapping and provide the space-time coding for two antennas as described above. Accordingly, each base station 14 is transmitting the same data at the same time, albeit in different formats. Again, each active sub-band is power boosted by $10 \log_{10}(x)$ dB. The mobile terminal 16 receives the entire frequency band, a portion from each base station 14, and performs space-time decoding and diversity combing to retrieve the packet data. Both of the above options can achieve SHO gain, which provides CIR improvement, by converting the transmission power of a SHO base station 14 from interference into a useful signal. The first option allows high data throughput, but without macro-diversity combining gain, wherein the second option yields a lower throughput, but provides macro-diversity gain. In general, the number of participating base stations 14 in SHO made can be reduced with the second option. Notably, there are several possible designs for the sub-band division, which may include interlacing and the like. Based on the teachings herein, those skilled in the art will recognize the various combinations to segregate the sub-bands among the participating base stations 14.

Figure 11:
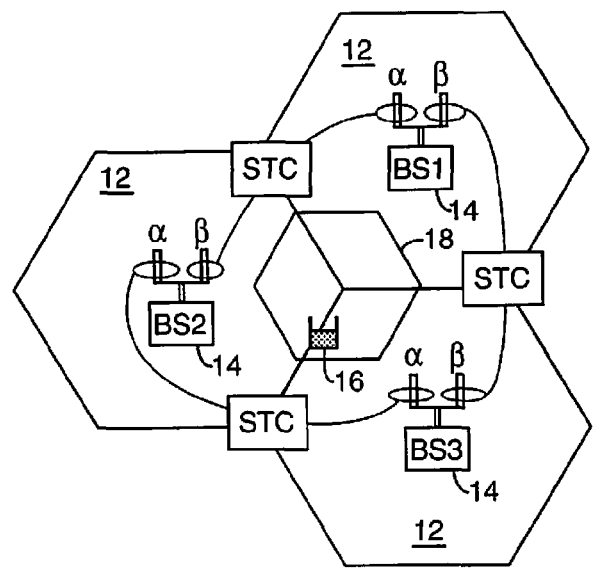
FIG. 11 is a block representation of a cellular communication system constructed according to one embodiment of the present invention.
Figure 12:
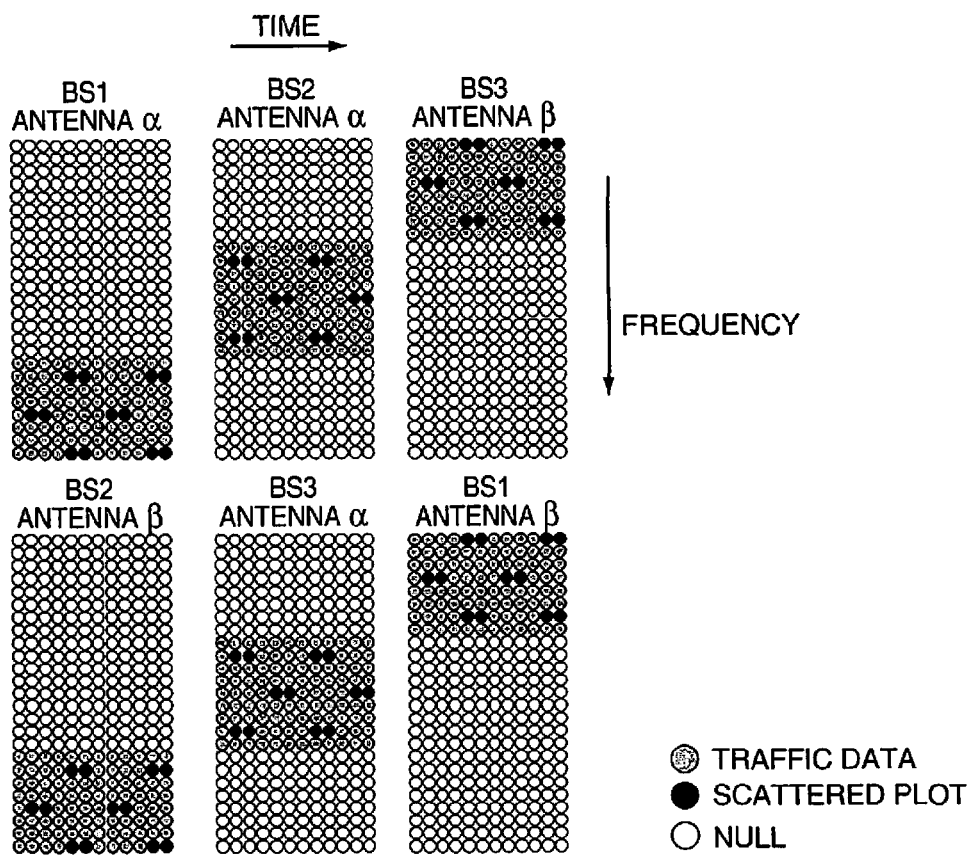
FIG. 12 is a diagram of frequency sub-band usage according to the embodiment of FIG. 11.

FIGS. 11 and 12 depict another MIMO-OFDM SHO scheme with joint base station diversity. In this embodiment, each base station 14 (BS1, BS2, and BS3) is associated with two antennas 28 (α and β). Unique to this embodiment is that spatial diversity is provided across base stations 14. As illustrated, the STC encoding results in two STC data streams, which are respectively transmitted from antennas at different base stations 14.

For non-multicast scheduling, a packet is divided into three unique sub-packets and sent to the base stations 14 (BS1, BS2, and BS3), respectively. Base station 14 (BS1) antenna α and Base station 14 (BS2) antenna β perform the space-time encoding for the first sub-packet; base station 14 (BS2) antenna a and base station 14 (BS3) antenna α perform the space-time encoding for the second sub-packet; and base station 14 (BS3) antenna β and base station 14 (BS1) antenna β perform the space-time encoding for the third sub-packet. Each antenna pair transmits one sub-packet, which is mapped onto one-third of the OFDM time-frequency sub-bands. The remaining two-thirds of the sub-bands are empty and not used for data transmission. Each transmitted sub-band is power boosted by $10 \log_{10}(x)$ dB, where x is the number of base stations 14 in SHO mode and is equal to three in this example. The mobile terminal 16 receives the entire frequency band and performs space-time decoding to retrieve the packet data.

For non-multicast scheduling, each packet is redundantly sent to the three base stations 14 (BS1, BS2, and BS3). Base station 14 (BS1) antenna α and Base station 14 (BS2) antenna β perform the space-time encoding for the packet; base station 14 (BS2) antenna α and base station 14 (BS3) antenna α perform the space-time encoding for the packet; and base station 14 (BS3) antenna β and base station 14 (BS1) antenna β perform the space-time encoding for the packet. Each antenna pair transmits a copy of the packet, which is mapped onto one-third of the OFDM time-frequency sub-bands. The remaining two-thirds of the sub-bands are empty and not used for data transmission. Each transmitted sub-band is power boosted by $10 \log_{10}(x)$ dB. Again, x is the number of base stations 14 in SHO mode and is equal to three in this example. The mobile terminal 16 receives the entire frequency band and performs space-time decoding to retrieve the packet data.

The joint STC scheme of FIG. 11 provides additional space-time coding gain over that provided in FIG. 9. The above examples for the MIMO-OFDM SHO space-time coding arrangement can be easily generalized into 2-way, 3-way and N-way SHO operation. Because of the frequency division property of OFDM systems, part of the band can be used for SHO while the remainder of the band is used for transmitting the data packet to non-SHO users by each base station 14. This provides more flexibility to the scheduling for multi-users applications.

During the transition from a non-SHO mode to a SHO mode, the base stations 14 will have residual data, which needs to be transmitted to the mobile terminals 16 and cannot be scheduled at the base station controller 10. Accordingly, the present invention uses a single-casting technique, wherein data delivery may be orchestrated such that only one base station 14 transmits data during SHO mode on select sub-bands while the other participating base stations 14 avoid using the sub-bands used by the base station 14 to send the data. In this manner, interference associated with the sub-bands of the other base stations 14 is minimized. During single-casting, joint scheduling and processing associated with combing data received in part or whole from multiple base stations 14 is unnecessary, since the entire data is sent from only one base station 14. Again, boosting power for the active sub-carriers is beneficial. Once the residual data has been transmitted to the mobile terminals 16, the multicasting or non-multicasting for mobile terminals 16 operating in a SHO mode takes over, wherein the base station controller 10 schedules data, which is either multicast or non-multicast, to the base stations 14 on the active set list, and then transmitted to the mobile terminals 16.

Figure 13:
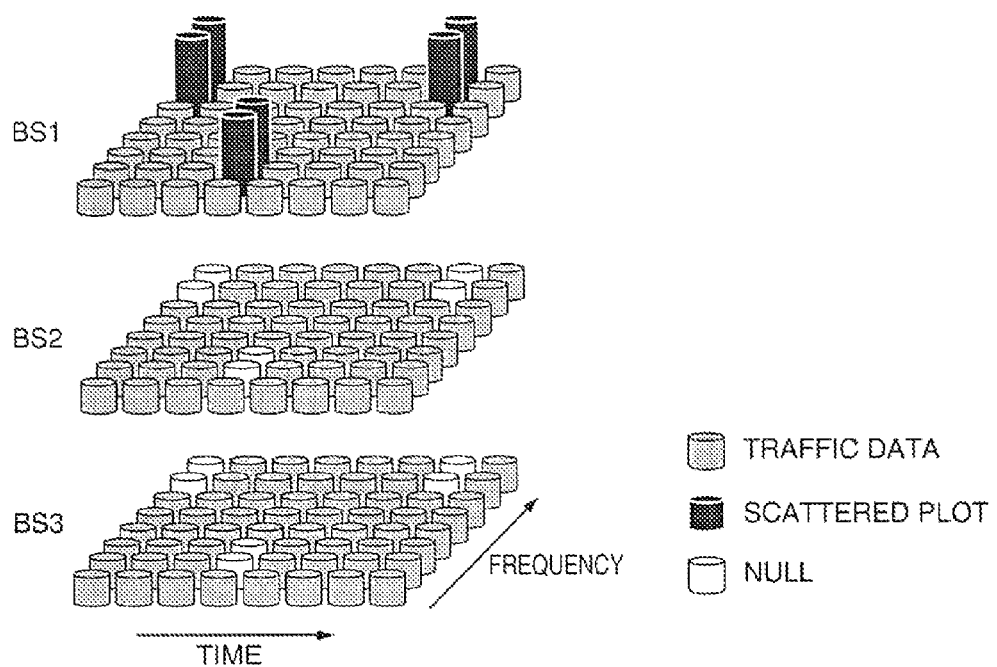
FIG. 13 is a diagram illustrating a technique for boosting the power associated with pilot signals while minimizing co-channel interference according to one embodiment of the present invention.

As noted above, an important element for STC decoding is accurate channel estimation. The scattered pilot patterns are designed for the adjacent base station's pilot signal re-use planning. A scattered pilot pattern can have cyclic layout on the time-frequency plane. In order to achieve high quality channel estimation for the space-time decoding, the interference from the adjacent base stations 14 must be minimized. In one embodiment of the present invention, power may be boosted for each base station's scattered pilot singles, while for the same sub-carrier location of the all the other base stations 14, these sub-carrier transmissions should be turned off to create a power null as illustrated in FIG. 13. With this arrangement, the scattered pilot sub-carriers are almost free from the co-channel interference.

Because the distances between mobile terminals 16 and base stations 14 are different for each set, there is a relative transmission delay between the signals from the different base stations 14. During the base station identification and timing synchronization stage, the mobile terminal 16 has already measured the timing synchronization positions corresponding to different SHO base stations 14 in the active set list. In the SHO mode, the earliest arrival time from a particular base station 14 is used as the synchronization position. As a result, only one base station 14 can be in perfect timing synchronization, while the others have certain time offsets.

In general, an OFDM signal can tolerate time offsets up to the difference of the prefix and the maximum channel delay. As long as the time offset is within this tolerance, the orthogonality of the sub-channel is preserved. However the time offset will cause an additional phase rotation, which increases linearly with respect to the sub-channel index. For non-coherent detection, no channel information is needed, so the same STC decoding method as used in the non-SHO mode can be applied by mobile terminal 16, if the differential encoding direction is performed along time. However, for coherent detection, accurate channel information is necessary. The time offset may cause problems during channel reconstruction.

Let X, Y, H represent the transmitted signal, received signal and the channel response in a frequency domain, respectively and ignore noise. For a 2×2 case (two transmit and receive paths):

$$Y(k)=H(k)X(k)$$

where $$Y(k) = \begin{bmatrix} Y^1(k) \\ Y^2(k) \end{bmatrix}, \quad X(k) = \begin{bmatrix} X^1(k) \\ X^2(k) \end{bmatrix}, \quad H(k) = \begin{bmatrix} h_{11}(k) & h_{21}(k) \\ h_{12}(k) & h_{22}(k) \end{bmatrix},$$

and k is the sub-carriers index.
If there is a time offset, the above relation should be modified as $$Y(k)=H'(k)X(k)$$

$$\text{where: } H'(k) = \begin{bmatrix} h'_{11}(k) & h'_{21}(k) \\ h'_{12}(k) & h'_{22}(k) \end{bmatrix},$$

$$h'_{ij}(k) = h_{ij}(k)\varphi_i(k), \quad \varphi_i(k) = \exp(-i2\pi k \delta t^i / N_{FFT}),$$

$\phi_i$ is the additional phase rotation introduced by the time offset for $i^{th}$ transmit antenna, and $\delta t^{(i)}$ is the time offset in samples caused by the timing synchronization error for the signals from $i^{th}$ transmit antenna. $\delta t^{(i)}$ is known during base station identification and timing synchronization.

Theoretically the equivalent channel response H' can be estimated and compensated with the help of pilot signals. However, since the channel estimation is based on the scattered pilots, care must be taken to compensate for relative transmission delay. The design principle of the density of the scattered pilots is to allow the reconstruction of the time and frequency varying channel response. The spacing between pilots in time direction is determined by the expected maximum Doppler frequency, while the spacing between pilots in the frequency direction is determined by the expected delay spread of the multi-path fading channel. The grid density of the scattered pilot pattern can provide enough sampling for the reconstruction of the propagation channel through interpolation. On the other hand, ϕ varies with the sub-carrier index, and its variation frequency increases with the increment of time offset. Therefore, the correlation bandwidth of the total equivalent channel response H' is determined by both the multi-path fading channel and the uncorrected time offset. As mentioned above, there is a time offset for the signals from the more distant base stations 14 because of the existence of the relative transmission delay. For example, in a 2×2 MIMO-OFDM system, 4 channels are needed for channel estimation. Two of them may have relatively large time offsets, and as a result, a fast additional phase rotation ϕ. Notably, the time offset will introduce fast phase rotation. When the variation of ϕ is much faster than that of H', the grid density of the scattered pilots may not satisfy the sampling theorem; therefore, H' cannot be obtained correctly by interpolation.

To obtain correct channel information for all the multiple channels during SHO, a compensation method can be applied. The idea is that only the propagation channel is interpolated, for the variation of ϕ is known. After FFT processing, the received time domain samples are transferred to frequency domain components. Then, $h_{ij}'(k)$ can be obtained at pilot sub-carriers k. Before interpolation is used to obtain the channel response for all the sub-carriers, the contribution from φ can be removed by multiplying $h_{ij}'(k)$ with the conjugate of $\phi_i(k)$, $$\tilde{h}ij(k) = h_{ij}'(k)\phi_i^*(k)$$

It should be noted that only the channels related to the base station 14 with time offset should be compensated. After interpolation, the channel response, $\tilde{h}_{ij}$, of all the useful sub-carriers are obtained. The total equivalent channel responses $h_{ij}'$ of all the useful sub-carriers are obtained by multiplying $\tilde{h}_{ij}$ with $\phi_i$.

In essence, the channel responses for each of the data sub-carriers of the OFDM signal are compensated for transmission delays associated with transmission from each of the multiple base stations 14 participating in the OFDM soft handoff. In general, the mobile terminal 16 will use the unique PN codes provided in the preambles of each of the pilot signals from each of the base stations 14 to determine the relative transmission delays from each of the base stations 14 participating in the OFDM soft hand-off. After a fast Fourier transform, the scattered pilot signals of the OFDM signals are extracted in the frequency domain for each receiver section. Channel responses for the scattered pilot signals are estimated for each transmit channel. Any additional phase rotation caused by the transmission delays from the estimated channel responses are removed, preferably using the multiplication techniques described above. At this point, the channel responses for the scattered pilot signals are known, and are used to interpolate the channel responses for the data sub-carriers in the OFDM signal. Once the channel responses for the OFDM data sub-carriers are estimated, the phase rotation caused by the transmission delays are added to the channel responses for each of the OFDM sub-carriers to provide the actual channel estimates to use during receiving transmissions from the various base stations 14.

The present invention provides an efficient soft handoff technique for OFDM systems and improves data rates while minimizing interference associated with OFDM communications with mobile terminals at cell borders. Those skilled in the art will recognize improvements and modifications to the preferred embodiments of the present invention. All such improvements and modifications are considered within the scope of the concepts disclosed herein and the claims that follow.

What is claimed is:

1. A system adapted to schedule data for a mobile terminal during a soft handoff mode and deliver at least a portion of scheduled data to the mobile terminal from at least one of a plurality of base stations comprising each base station participating in the soft handoff being adapted to:
   process the scheduled data for delivery to the mobile terminal;
   provide coding for the scheduled data to generate a plurality of spatially coded signals;
   perform a transform on each of the plurality of spatially coded signals to generate a plurality of orthogonal frequency division multiplexed signals, each of the plurality of spatially coded signals configured to result in corresponding frequency division multiplexed orthogonal signals mapped into defined sub-bands in an orthogonal frequency division multiplexed spectrum of sub-bands, the defined sub-bands not used by other ones of the base stations participating in the soft handoff; and
   transmit the plurality of orthogonal frequency division multiplexed signals with spatial diversity for reception by the mobile terminal.

2. The system of claim 1 wherein each base station is further adapted to provide the coding such that the plurality of coded signals are configured to result in a power boost associated with the defined sub-bands.

3. The system of claim 1 wherein each base station is further adapted to provide the coding such that the plurality of coded signals are configured to result in a null associated with sub-bands in the orthogonal frequency division multiplexed spectrum other than the defined sub-bands.

4. The system of claim 1, wherein each base station is further configured to provide the coding wherein each of the plurality of orthogonal frequency division multiplexed signals includes identical data with different encoding.

5. The system of claim 1, wherein each base station is further configured to provide the coding wherein each of the plurality of orthogonal frequency division multiplexed signals includes different parts of the scheduled data.

6. The system of claim 1, wherein each base station is further configured to insert scattered pilot signals in the plurality of orthogonal frequency division multiplexed signals.

7. A base station in an orthogonal frequency division multiplexing system comprising:
   encoding logic adapted to provide spatial coding of scheduled data to generate a plurality of spatially coded signals;
   transform logic adapted to provide a transform on each of the plurality of spatially coded signals to generate a plurality of orthogonal frequency division multiplexing signals, wherein during a soft handoff, each of the plurality of spatially coded signals is configured to result in corresponding orthogonal frequency division multiplexing signals mapped into defined sub-bands in an orthogonal frequency division multiplexing spectrum of sub-bands, the defined sub-bands not used by other base stations participating in the soft handoff; and
   transmit circuitry having a plurality of transmit paths to facilitate transmitting the plurality of orthogonal frequency division multiplexing signals with spatial diversity for reception by the mobile terminal.

8. The base station of claim 7, wherein the base station is further configured to provide the coding such that the plurality of coded signals are configured to result in a power boost associated with the defined sub-bands.

9. The base station of claim 7, wherein the base station is further configured to provide the coding such that the plurality of coded signals are configured to result in a null associated with sub-bands in the orthogonal frequency division multiplexed spectrum other than the defined sub-bands.

10. The base station of claim 7, wherein the base station is further configured to provide the coding wherein each of the plurality of orthogonal frequency division multiplexed signals includes identical data with different encoding.

11. The base station of claim 7, wherein the base station is further configured to provide the coding wherein each of the plurality of orthogonal frequency division multiplexed signals includes different parts of the scheduled data.

12. The base station of claim 7, wherein the base station is further adapted to insert scattered pilot signals in the plurality of orthogonal frequency division multiplexed signals.

13. A method for facilitating soft handoffs in an orthogonal frequency division multiplexing system comprising:
   providing spatial coding of scheduled data to generate a plurality of spatially coded signals;
   generating a transform on each of the plurality of spatially coded signals to generate a plurality of orthogonal frequency division multiplexing signals, wherein during a soft handoff, each of the plurality of space-time coded signals is configured to result in corresponding orthogonal frequency division multiplexing signals mapped into defined sub-bands in an orthogonal frequency division multiplexing spectrum of sub-bands, the defined sub-bands not used by other base stations participating in the soft handoff; and transmitting the plurality of orthogonal frequency division multiplexing signals with spatial diversity for reception by the mobile terminal.

14. The method of claim 13, further comprising providing the coding such that the plurality of coded signals are configured to result in a power boost associated with the defined sub-bands.

15. The method of claim 13, further comprising providing the coding such that the plurality of coded signals are configured to result in a null associated with sub-bands in the orthogonal frequency division multiplexed spectrum other than the defined sub-bands.

16. The method of claim 13, further comprising providing the coding wherein each of the plurality of orthogonal frequency division multiplexed signals includes identical data with different encoding.

17. The method of claim 13, further comprising providing the coding wherein each of the plurality of orthogonal frequency division multiplexed signals includes different parts of the scheduled data.

18. The method of claim 13, further comprising inserting scattered pilot signals in the plurality of orthogonal frequency division multiplexed signals.

* * * * *